(12) United States Patent  (10) Patent No.: US 7,446,804 B2
Nanjo                      (45) Date of Patent:     Nov. 4, 2008

(54) CAMERA SYSTEM AND ZOOM LENS

(75) Inventor: Yusuke Nanjo, Kanagawa (JP)

(73) Assignee: Sony Corporation (JP)

( * ) Notice: Subject to any disclaimer, the term of this patent is extended or adjusted under 35 U.S.C. 154(b) by 760 days.

(21) Appl. No.: 11/140,248

(22) Filed: May 31, 2005

(65) Prior Publication Data
US 2005/0275735 A1   Dec. 15, 2005

(30) Foreign Application Priority Data
Jun. 14, 2004   (JP)   ............... P2004-175236

(51) Int. Cl.
H04N 5/262   (2006.01)
H04N 5/76    (2006.01)
G02B 15/14   (2006.01)
(52) U.S. Cl. .............. 348/240.3; 359/684; 359/676; 348/231.99
(58) Field of Classification Search ......... 348/231.99, 348/240.3; 359/676, 683, 684
See application file for complete search history.

(56) References Cited
U.S. PATENT DOCUMENTS
2006/0055815 A1*  3/2006  Nanjo et al. ............ 348/360

2006/0152816 A1*  7/2006  Kuroda et al. .......... 359/684
2007/0008418 A1*  1/2007  Kuroda et al. .......... 348/240.3

FOREIGN PATENT DOCUMENTS
JP    08-248318     9/1996
JP    11-084239     3/1999
JP    2000-105336   4/2000

* cited by examiner

Primary Examiner—David N Spector
(74) Attorney, Agent, or Firm—Rader Fishman & Grauer PLLC; Ronald P. Kananen

(57) ABSTRACT

The present invention provides a camera system which comprises: a zoom lens; phototaking means converting an image captured by the zoom lens into an electric image signal; and image control means, in which the zoom lens is made up of a first lens group having positive refracting power, a second lens group having negative refracting power, a third lens group having positive refracting power, a fourth lens group having negative refracting power, and a fifth lens group having positive refracting power, which are disposed in this order from an object side, and is configured so that the first lens group, the third lens group, and the fifth lens group are stationary; the second lens group is shifted in an optical axis direction to mainly perform variable power; and the fourth lens group is shifted in the optical axis direction to perform correction for image position fluctuations and focusing.

32 Claims, 13 Drawing Sheets

CAMERA SYSTEM AND ZOOM LENS

CROSS REFERENCES TO RELATED APPLICATIONS

The present document contains subject matter related to Japanese Patent Application JP 2004-175236 filed in the Japanese Patent Office on Jun. 14, 2004, the entire contents of which being incorporated herein by reference.

BACKGROUND OF THE INVENTION

1. Field of the Invention

The present invention relates to a novel zoom lens and, in particular, to a zoom lens suitable for a video camera or a digital still camera, and a camera system using the same. Specifically, this invention relates to a camera system covering an ultra-wide-angle range and having a small F-number at a wide angle end, in which various aberrations other than distortion are corrected properly. Moreover, video signals obtained from a zoom lens and an image sensor, having an extremely small front lens diameter, are processed to correct the distortion due to this zoom lens, thereby obtaining an excellent image.

2. Description of Related Art

Japanese Examined Patent Application Publication (KOKOKU) No. Sho 50-26931 (Patent document 1) indicates that it is suitable for achieving high power to employ a five-group zoom system constructed by arranging refracting power in order from an object side: positive; negative; positive; negative; and positive, in which a first lens group, a third lens group, and a fifth lens group are stationary, a second lens group is shifted in an optical axis direction to perform variable power, and a fourth lens group corrects a focal shift due to zooming.

While the zoom ratio in the above patent document 1 is approximately 20 times, the applicant has proposed in Japanese Patent Application Publication (KOKAI) No. Hei 11-84239 (Patent document 2) an ultrahigh ratio zoom lens, small in size but having a zoom ratio reaching 50 times, by developing the above five-group zoom system. Specifically, in this zoom system, the fourth lens group also performs focusing, an aspheric surface is introduced into the first lens group, and the shapes of the lenses in the respective lens groups are optimized while reducing the number of the lenses.

Moreover, the applicant has proposed in Japanese Patent Application Publication (KOKAI) No. 2000-105336 (Patent document 3) an ultra-wide-angle, ultrahigh ratio zoom lens whose angle of view at a wide angle end reaches approximately 86° and whose zoom ratio is approximately 40 times, by applying a lens configuration suitable for ultra-wide-angle to the first lens group in the above five-group zoom system.

Since a high power zoom lens involves an increase in total length, inconvenience may occur depending on the shape of the camera system. Consequently, the applicant has proposed in Japanese Patent Application Publication (KOKAI) No. Hei 8-248318 (Patent document 4) means that shorten the dimension, in a depth direction, by disposing a concave lens group at a position closest to an object side in the first lens group, and disposing a right-angle prism immediately behind it so as to refract an optical path.

SUMMARY OF THE INVENTION

The ultrahigh ratio zoom lens covering an ultra-wide-angle to an ultra-telephoto has been achieved in the above patent document 3. However, there is a drawback that the front lens diameter increases with progress in ultra-wide-angle.

Further, since the focal length of the telephoto end becomes the region of an ultra-telephoto lens close to 1000 mm in terms of 35-mm format, the secondary spectrum of axial chromatic aberration becomes a main factor of image quality deterioration. For its correction, the convex lens of the first lens group calls for at least one or more ultra-low dispersion glasses having abnormal dispersion property. This type of glass has a drawback of poor productivity in mass production. In particular, there are the following drawbacks: that this glass scratches easily during polishing; that latent scratches become significant and turn into scratches during ultrasonic cleaning; and that when outside air is admitted after heating and coating a lens, in the step of vacuum deposition, the lens is quickly cooled and is apt to crack.

One advantage of the present invention is to provide an ultra-wide-angle zoom lens, in which such an ultra-wide-angle that the angle of view at a wide angle end is not less than 80° is enabled by changing the configuration of the first lens group into a different configuration than the above patent document 3, and in which the increase in the front lens diameter is minimized to achieve harmonization between ultra-wide-angle and miniaturization.

Another advantage of the present invention is to provide a lens configuration that overcomes the poor productivity of ultra-low dispersion glass, that is less susceptible to polishing scratches and latent scratches, and that requires no vacuum deposition step.

Furthermore, distortion, the correction for which inevitably becomes difficult by achieving the harmonization between the ultra-wide-angle and the miniaturization of front lens diameter, is corrected by video signal processing. Also, the ratio of the angle of view at a wide angle end to that at a telephoto end, which is obtainable from an image plane after distortion correction, is redefined as a zoom ratio. These result in reducing a paraxial focal length ratio (a general definition of zoom ratio), thereby enabling further miniaturization.

Still another advantage of the present invention is to provide a camera system that enables miniaturization relative to a necessary zoom ratio by actively and greatly causing negative distortion at a wide angle end and positive distortion at a telephoto end, so that the change in the angle of view after distortion correction is sufficiently great for the change in paraxial focal length.

Still another advantage of the present invention is to provide means that shorten the dimension in a depth direction if an increase in the total length of a lens with increasing magnification is unfavorable as the shape of a camera system.

To solve the above-mentioned drawbacks, a camera system according to a first aspect of the present invention includes a zoom lens; a phototaking means that converts an image captured by the zoom lens into an electric image signal; and an image control means. The image control means is configured so as to form a new image signal subjected to coordinate conversion by shifting a point on an image defined by an image signal formed through the phototaking means, while referring to a conversion coordinate factor previously provided in response to a variable power rate through the zoom lens, and then output the new image signal. The zoom lens is made up of a first lens group having positive refracting power, a second lens group having negative refracting power, a third lens group having positive refracting power, a fourth lens group having negative refracting power, and a fifth lens group having positive refracting power, which are disposed in this order from an object side. The first lens group, the third lens group, and the fifth lens group are stationary. The second lens group is shifted in an optical axis direction so as to mainly perform variable power, and the fourth lens group is shifted in the optical axis direction so as to perform correction for image position fluctuations and focusing. The first lens group is configured by disposing, in order from the object side, a concave lens group made up of one or more lenses; a convex lens with a strong convexity facing toward an image side; a cemented lens including a concave lens and a convex lens having an Abbe number vd not less than 84; and a convex lens with a strong convexity facing toward the object side, wherein a surface making contact with the air of the cemented lens and at least one surface of the convex lens closest to the image side are composed of an aspheric surface.

According to a second aspect of the present invention, there is provided a zoom lens made up of a first lens group having positive refracting power, a second lens group having negative refracting power, a third lens group having positive refracting power, a fourth lens group having negative refracting power, and a fifth lens group having positive refracting power, which are disposed in this order from an object side. The first lens group, the third lens group, and the fifth lens group are stationary. The second lens group is shifted in an optical axis direction so as to mainly perform variable power, and the fourth lens group is shifted in the optical axis direction so as to perform correction for image position fluctuations and focusing. The first lens group is configured by disposing, in order from the object side, a concave lens group made up of one or more lenses; a convex lens with a strong convexity facing toward an image side; a cemented lens including a concave lens and a convex lens having an Abbe number vd not less than 84; and a convex lens with a strong convexity facing toward the object side, wherein a surface making contact with the air of the cemented lens and one surface of the convex lens closest to the image side are composed of an aspheric surface.

Therefore, the zoom lens of the present invention enables miniaturization of front lens diameter while achieving an ultrahigh ratio covering from an ultra-wide-angle to an ultra-telephoto. The camera system of the present invention enables one a high quality image by virtue of distortion reduction while making use of the above-mentioned zoom lens.

According to a third aspect of the present invention, there is provided a camera system including a zoom lens; a phototaking means that converts an image captured by the zoom lens into an electric image signal; and an image control means. The image control means is configured so as to form a new image signal subjected to coordinate conversion by shifting a point on an image defined by an image signal formed through the phototaking means, while referring to a conversion coordinate factor previously provided in response to a variable power rate through the zoom lens, and then output the new image signal. The zoom lens is made up of a first lens group having positive refracting power, a second lens group having negative refracting power, a third lens group having positive refracting power, a fourth lens group having negative refracting power, and a fifth lens group having positive refracting power, which are disposed in this order from an object side. The first lens group, the third lens group, and the fifth lens group are stationary. The second lens group is shifted in an optical axis direction so as to mainly perform variable power, and the fourth lens group is shifted in the optical axis direction so as to perform correction for image position fluctuations and focusing. The first lens group is configured by disposing, in order from the object side, a concave lens group made up of one or more lenses; a prism that refracts an optical path by reflection; a convex lens with a strong convexity facing toward an image side; a cemented lens including a concave lens and a convex lens having an Abbe number vd not less than 84; and a convex lens with a strong convexity facing toward the object side, wherein a surface making contact with the air of the cemented lens and at least one surface of the convex lens closest to the image side are composed of an aspheric surface.

According to a fourth aspect of the present invention, there is provided a zoom lens made up of a first lens group having positive refracting power, a second lens group having negative refracting power, a third lens group having positive refracting power, a fourth lens group having negative refracting power, and a fifth lens group having positive refracting power, which are disposed in this order from an object side. The first lens group, the third lens group, and the fifth lens group are stationary. The second lens group is shifted in an optical axis direction so as to mainly perform variable power, and the fourth lens group is shifted in the optical axis direction so as to perform correction for image position fluctuations and focusing. The first lens group is configured by disposing, in order from the object side, a concave lens group made up of one or more lenses; a prism that refracts an optical path by reflection; a convex lens with a strong convexity facing toward an image side; a cemented lens including a concave lens and a convex lens having an Abbe number vd not less than 84; and a convex lens with a strong convexity facing toward the object side, wherein a surface making contact with the air of the cemented lens and at least one surface of the convex lens closest to the image side are composed of an aspheric surface.

Therefore, the zoom lens of the present invention enables miniaturization of front lens diameter while achieving an ultrahigh ratio covering from an ultra-wide-angle to an ultra-telephoto, and also enables miniaturization in a depth direction, that is, an optical axis direction of incidence toward a front lens, thereby contributing to a thinner camera system. The camera system of the present invention enables one to obtain a high quality image by virtue of distortion reduction while making use of the above-mentioned zoom lens, and also realizes miniaturization in a depth direction, that is, a thinner camera system.

According to the present invention, there is provided a camera system including a zoom lens; a phototaking means that converts an image captured by the zoom lens into an electric image signal; and an image control means. The image control means is configured so as to form a new image signal subjected to coordinate conversion by shifting a point on an image defined by an image signal formed through the phototaking means, while referring to a conversion coordinate factor previously provided in response to a variable power rate through the zoom lens, and then output the new image signal. The zoom lens is made up of a first lens group having positive refracting power, a second lens group having negative refracting power, a third lens group having positive refracting power, a fourth lens group having negative refracting power, and a fifth lens group having positive refracting power, which are disposed in this order from an object side. The first lens group, the third lens group, and the fifth lens group are stationary. The second lens group is shifted in an optical axis direction so as to mainly perform variable power, and the fourth lens group is shifted in the optical axis direction so as to perform correction for image position fluctuations and focusing. The first lens group is configured by disposing, in order from the object side, a concave lens group made up of one or more lenses; a convex lens with a strong convexity facing toward an image side; a cemented lens including a concave lens and a convex lens having an Abbe number vd not less than 84; and a convex lens with a strong convexity facing toward the object side, wherein a surface making contact with the air of the cemented lens and at least one surface of the convex lens closest to the image side are aspheric surfaces.

According to the present invention, there is provided a zoom lens made up of a first lens group having positive refracting power, a second lens group having negative refracting power, a third lens group having positive refracting power, a fourth lens group having negative refracting power, and a fifth lens group having positive refracting power, which are disposed in this order from an object side. The first lens group, the third lens group, and the fifth lens group are stationary. The second lens group is shifted in an optical axis direction so as to mainly perform variable power, and the fourth lens group is shifted in the optical axis direction so as to perform correction for image position fluctuations and focusing. The first lens group is configured by disposing, in order from the object side, a concave lens group made up of one or more lenses; a convex lens with a strong convexity facing toward an image side; a cemented lens including a concave lens and a convex lens having an Abbe number vd not less than 84; and a convex lens with a strong convexity facing toward the object side, wherein a surface making contact with the air of the cemented lens and at least one surface of the convex lens closest to the image side are aspheric surfaces.

Therefore, the zoom lens of the present invention can achieve miniaturization of front lens diameter by replacing the configuration of the first lens group with a new configuration, while achieving an ultrahigh ratio covering from an ultra-wide-angle to an ultra-telephoto. The camera system of the present invention enables further miniaturization of the front lens diameter by correcting through image processing the distortion generated in achieving the miniaturization of the front lens diameter.

According to the present invention, there is provided a camera system including a zoom lens; a phototaking means that converts an image captured by the zoom lens into an electric image signal; and an image control means. The image control means is configured so as to form a new image signal subjected to coordinate conversion by shifting a point on an image defined by an image signal formed through the phototaking means, while referring to a conversion coordinate factor previously provided in response to a variable power rate through the zoom lens, and then output the new image signal. The zoom lens is made up of a first lens group having positive refracting power, a second lens group having negative refracting power, a third lens group having positive refracting power, a fourth lens group having negative refracting power, and a fifth lens group having positive refracting power, which are disposed in this order from an object side. The first lens group, the third lens group, and the fifth lens group are stationary. The second lens group is shifted in an optical axis direction so as to mainly perform variable power, and the fourth lens group is shifted in the optical axis direction so as to perform correction for image position fluctuations and focusing. The first lens group is configured by disposing, in order from the object side, a concave lens group made up of one or more lenses; a prism that refracts an optical path by reflection; a convex lens with a strong convexity facing toward an image side; a cemented lens including a concave lens and a convex lens having an Abbe number vd not less than 84; and a convex lens with a strong convexity facing toward the object side, wherein a surface making contact with the air of the cemented lens and at least one surface of the convex lens closest to the image side are aspheric surfaces.

According to the present invention, there is provided a zoom lens made up of a first lens group having positive refracting power, a second lens group having negative refracting power, a third lens group having positive refracting power, a fourth lens group having negative refracting power, and a fifth lens group having positive refracting power, which are disposed in this order from an object side. The first lens group, the third lens group, and the fifth lens group are stationary. The second lens group is shifted in an optical axis direction so as to mainly perform variable power, and the fourth lens group is shifted in the optical axis direction so as to perform correction for image position fluctuations and focusing. The first lens group is configured by disposing, in order from the object side, a concave lens group made up of one or more lenses; a prism that refracts an optical path by reflection; a convex lens with a strong convexity facing toward an image side; a cemented lens including a concave lens and a convex lens having an Abbe number vd not less than 84; and a convex lens with a strong convexity facing toward the object side, wherein a surface making contact with the air of the cemented lens and at least one surface of the convex lens closest to the image side are aspheric surfaces.

Therefore, the zoom lens of the present invention can achieve miniaturization of front lens diameter by replacing the configuration of the first lens group with a new configuration, while achieving an ultrahigh ratio covering from an ultra-wide-angle to an ultra-telephoto. This zoom lens also enables miniaturization in a depth direction, that is, an optical axis direction of incidence toward a front lens, thereby contributing to a thinner camera system. The above camera system enables further miniaturization of the front lens diameter by correcting through image processing the distortion generated in achieving the miniaturization of the front lens diameter.

In an embodiment of the present invention, the above-mentioned cemented lens of the first lens group is configured as a triple-cemented lens made up of a concave meniscus lens with a convexity facing toward an object side, a double convex lens having an Abbe number vd not less than 84, and a concave meniscus lens with a concavity facing toward the object side. Consequently, latent scratches generated on a convex lens made up of an ultra-low dispersion glass sandwiched between two concave lenses are filled with adhesive used for cementing, so that they hardly affect optically. Moreover, cementing concave lenses to both surfaces of the convex lens composed of the ultra-low dispersion glass eliminates the necessity of coating to the ultra-low dispersion glass, thereby increasing productivity.

In another embodiment of the present invention, the concave lens group closest to the object side in the first lens group is composed of one concave lens, and satisfies each of the following respective conditional expressions:

$$5 < |f1F|/f1; \quad (1)$$

$$0.4 < dp/f1 < 1.5; \text{ and} \quad (2)$$

$$0.2 < H1'/f1 < 0.35, \quad (3)$$

where:

f1 is a focal length of the first lens group;

f1F is a synthetic focal length of the concave lens group closest to the object side of the first lens group and the convex lens with a strong convexity toward the image side;

dp is a thickness of the convex lens with a strong convexity toward the image side of the first lens group (provided, if the first lens group includes a prism that refracts an optical path by reflection, dp is a sum of the thickness of the prism and that of the convex lens with a strong convexity toward the image side);

H1' is a distance from a vertex of a surface closest to the image side of the first lens group to a principal point on the image side of the first lens group ("−" indicates the object side, and "+" indicates the image side).

This prevents excessive aberration variations, due to error factors such as spherical aberration, coma aberration, and decentering, so that the front lens diameter can be minimized effectively. Further, excellent aberration correction is enabled while maintaining the angle of view at a wide angle end at not less than 80°.

In still another embodiment, the concave lens group closest to the object side of the above-mentioned first lens group is composed of two lenses of a concave meniscus lens with a convexity to the object side and a double concave lens, and satisfies each of the following respective conditional expressions:

$$4 < |f1F|/f1; \quad (1')$$

$$0.4 < dp/f1 < 1.5; \text{ and} \quad (2)$$

$$0.35 < H1'/f1 < 0.6, \quad (4)$$

where:

dp is a thickness of the convex lens with a strong convexity toward the image side of the first lens group (provided, if the first lens group includes a prism that refracts an optical path by reflection, dp is a sum of the thickness of the prism and that of the convex lens with a strong convexity toward the image side).

This prevents excessive aberration variations, due to error factors such as spherical aberration, coma aberration, and decentering, so that the front lens diameter can be minimized effectively. Furthermore, excellent aberration correction is enabled while maintaining the angle of view at a wide angle end at not less than 80°.

In yet another embodiment, an aspheric surface of the first lens group is disposed on a surface on the object side of the convex lens closest to the image side of the first lens group, and in such a shape that curvature is more relaxed than a paraxial spherical surface as the distance from an optical axis increases within an effective diameter. Therefore, the corrections for spherical aberration and coma aberration can be performed properly. Furthermore, the inclination of a principal ray having a wide angle of view can be relaxed to facilitate aberration correction in the second and the later lens groups.

In yet another embodiment, higher variable power is enabled while achieving miniaturization in an optical axis direction, in addition to the miniaturization of front lens diameter, because each of the following respective conditional expressions is satisfied:

$$0.35 < |f2|/\sqrt{(fW \cdot fT)} < 0.55; \quad (5)$$

$$3.5 \leq f3/fw < 9; \quad (6)$$

$$4.5 < |f4|/fW < 10; \quad (7)$$

$$4 \leq f5/fW < 8; \text{ and} \quad (8)$$

$$1.0 < D4W/|f4| < 1.3, \quad (9)$$

where:

fW is a focal length of the overall system at a wide angle end;

fT is a focal length of the overall system at a telephoto end;

fi is a focal length of the i-th lens group;

D4W is spacing between the fourth lens group and the fifth lens group when focusing on an infinite object at a wide angle end.

DESCRIPTION OF EMBODIMENTS

Best modes for implementing the camera system and the zoom lens of the present invention will next be described with reference to the accompanying drawings.

First, one embodiment of the camera system of the present invention will be described with reference to FIG. 1.

Figure 1:
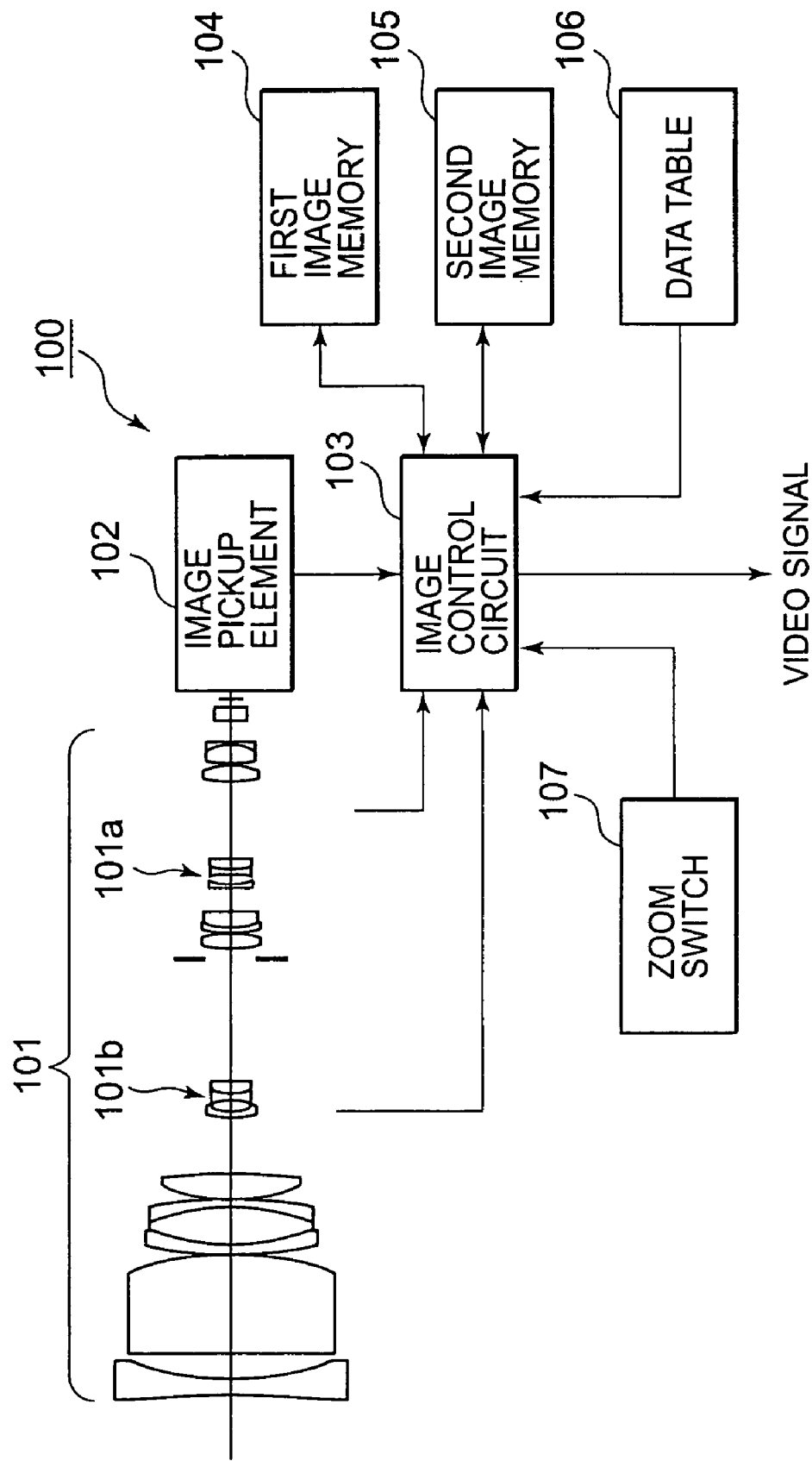
FIG. 1 is a block diagram showing a configuration of a camera system of the present invention.

FIG. 1 is a block diagram showing an example of the configuration of a camera system 100 according to the present invention. In FIG. 1, the reference numeral 101 indicates a phototaking lens capable of zooming, which is provided with a focus lens 101a and a variator lens 101b; 102 indicates an image sensor such as a CCD; 103 indicates an image control circuit for performing control of various operations, such as correction for distortion of an image; 104 indicates a first image memory for storing image data obtainable from the image sensor 102; and 105 indicates a second image memory for storing image data in which distortion has been corrected. The reference numeral 106 indicates a data table for storing distortion information; and 107 indicates a zoom switch for converting an operator's zooming instruction into an electric signal.

For example, if any of zoom lenses 1, 2 and 3 according to the following embodiments is applied to the phototaking lens 101, the focus lens 101a functions as a fourth lens group G4, and the variator lens 101b functions as a second lens group G2.

As shown in FIG. 3 to FIG. 5, FIG. 7 to FIG. 9, and FIG. 11 to FIG. 13, a distortion curve varies depending on zooming. Consequently, the distortion fluctuations depend on the position of the variator lens 101b. Hence, the data table 106 stores conversion coordinate factors, which associate the two-dimensional position information of the first image memory 104 and the second image memory 105 at certain positions of the variator lens 101b. Moreover, the position of the variator lens 101b is divided into many positions from a wide angle end to a telephoto end, and conversion coordinate factors corresponding to their respective positions are stored in the data table 106.

When an operator operates the zoom switch 107 to shift the position of the variator lens 101b, the image control circuit 103 shifts the focus lens 101a to control such that focus is not blurred, and also receives the conversion coordinate factor corresponding to the position of the variator lens 101b, from the data table 106. When the position of the variator lens 101b does not correspond to any of previously divided positions, a proper conversion coordinate factor is obtained from the conversion coordinate factor for a position in the vicinity thereof with the aid of processing, such as interpolation. The conversion coordinate factors are factors for shifting the positions of points on an image arranged discretely in two dimensions. With respect to an image between the points arranged discretely, a shift-destination position is found from processing, such as interpolation. The image control circuit 103 corrects distortion by performing vertical and horizontal image shift processing on the basis of this conversion coordinate factor, onto the information of the first image memory 104 obtained from the image sensor 102, and creates, in the second image memory 105, image information in which the distortion has been corrected, and then outputs, as a video signal, a signal based on the image information created in the second image memory 105.

A zoom lens of the present invention suitable for use in the above-mentioned camera system 100 will next be described.

The zoom lens is made up of a first lens group having positive refracting power, a second lens group having negative refracting power, a third lens group having positive refracting power, a fourth lens group having negative refracting power, and a fifth lens group having positive refracting power, which are disposed in this order from an object side. The first lens group, the third lens group, and the fifth lens group are stationary. The second lens group is shifted in an optical axis direction so as to mainly perform variable power, and the fourth lens group is shifted in the optical axis direction so as to perform correction for image position fluctuations and focusing. The first lens group is configured by disposing, in order from the object side, a concave lens group made up of one or more lenses; a convex lens with a strong convexity facing toward an image side; a cemented lens including a concave lens and a convex lens having an Abbe number vd not less than 84; and a convex lens with a strong convexity facing toward the object side, wherein a surface making contact with the air of the cemented lens and at least one surface of the convex lens closest to the image side are composed of an aspheric surface.

Another zoom lens is made up of a first lens group having positive refracting power, a second lens group having negative refracting power, a third lens group having positive refracting power, a fourth lens group having negative refracting power, and a fifth lens group having positive refracting power, which are disposed in this order from an object side. The first lens group, the third lens group, and the fifth lens group are stationary. The second lens group is shifted in an optical axis direction so as to mainly perform variable power, and the fourth lens group is shifted in the optical axis direction so as to perform correction for image position fluctuations and focusing. The first lens group is configured by disposing, in order from the object side, a concave lens group made up of one or more lenses; a prism that refracts an optical path by reflection; a convex lens with a strong convexity facing toward an image side; a cemented lens including a concave lens and a convex lens having an Abbe number vd not less than 84; and a convex lens with a strong convexity facing toward the object side, wherein a surface making contact with the air of the cemented lens and at least one surface of the convex lens closest to the image side are composed of an aspheric surface.

The zoom lens of the present invention, which is an ultra-high ratio zoom lens covering an ultra-wide-angle to an ultra-telephoto, achieves miniaturization of front lens diameter by replacing the configuration of the first lens group with a new configuration. Specifically, the concave lens group made up of one or more lenses and a convex lens with a strong convexity facing toward the image side, which are disposed in order from the object side, constitute a configuration close to an afocal system, whose angular magnification is less than 1. Thereby, the inclination of a principal ray having a wide angle of view can be relaxed to facilitate distortion correction in the later lens systems. Additionally, the inclination of the principal ray can further be reduced to achieve miniaturization of the front lens diameter by increasing the thickness of this convex lens with the strong convexity facing toward the image side, in an appropriate range.

The configuration for reducing the inclination of the principal ray by the above concave lens group and the thick convex lens is effective for achieving the ultra-wide-angle and miniaturization of the front lens diameter. However, barrel distortion at a wide angle end is largely generated, and it is therefore extremely difficult to correct the distortion by the later lens systems, while realizing the miniaturization at the same time. Accordingly, the zoom lens of the present invention is combined with the above-mentioned camera system 100, which comprises a phototaking means that converts an image into an electric image signal, and an image control means, in which the image control means is configured so as to form a new image signal subjected to coordinate conversion by shifting a point on an image defined by an image signal formed through the phototaking means, while referring to a conversion coordinate factor previously provided in response to a variable power rate through the zoom lens, and then output the new image signal so that various aberrations containing distortion can be corrected properly. Further, it is possible to obtain a camera system that is miniaturized while covering from an ultra-wide-angle range to an ultra-telephoto range.

In accordance with another zoom lens of the present invention, the thick convex lens that is an element of a configuration close to the above-mentioned afocal system of the first lens group can be established by a plano-convex lens. Therefore, by dividing this into two elements of a thick plane parallel glass and a convex lens, and replacing the thick plane parallel glass with a right-angle prism, the dimension in a depth direction can be shortened by refracting an optical path by reflection, without increasing excessively the volume of the overall optical system.

To overcome the drawback that an ultra-low dispersion glass required for correcting the secondary spectrum of chromatic aberration at a telephoto end is unsuitable for mass production, the zoom lens of the present invention improves productivity by disposing a triple-cemented lens made up of a concave lens, a convex lens, and a concave lens in a first lens group, and employing an ultra-low dispersion glass as the convex lens sandwiched between the two concave lenses. First, with regard to the problem of scratches and latent scratches in an ultra-low dispersion glass, in place of a particular processing for generating no scratches, the same processing as in other general glasses is performed, and the generated scratches are filled with adhesive used in cementing so that there is little optical effect. Likewise, both surfaces of a convex lens made of ultra-low dispersion glass are to be cemented surfaces so that the necessity of coating can be eliminated, and also higher costs due to cracking during a vacuum deposition step and a prolonged cooling time can be avoided. In order that the scratches are filled with resin (adhesive) and no direct coating is applied to the ultra-low dispersion glass, the convex lens made of the ultra-low dispersion glass is sandwiched between the two concave lenses required for aberration correction. The same effect can be obtained by forming a resin coat on both surfaces of the convex lens made of the ultra-low dispersion glass, instead of cementing the concave lens to both surfaces of the convex lens made of ultra-low dispersion glass.

Meanwhile, in the zoom lens of the present invention, it is also possible to shift an image by shifting one lens group, or part of one lens group among the lens groups constituting the lens system, in a direction approximately vertical to an optical axis. It is possible to have it function as a vibration reduction optical system by combining with a detection system for detecting camera shake, a drive system for shifting the above-mentioned lens group, and a control system for applying a shift amount to the drive system according to the output of the detection system. Particularly, in the zoom lens of the present invention, it is possible to shift an image with less aberration variations by shifting the third lens group or, alternatively, part or the entire of the fifth lens group in a direction approximately vertical to an optical axis.

Preferably, the zoom lens of the present invention satisfies each of the following conditional expressions (1) to (9):

$$5 < |f1F|/f1; \quad (1)$$

$$4 < |f1F|/f1; \quad (1')$$

$$0.4 < dp/f1 < 1.5; \quad (2)$$

$$0.2 < H1'/f1 < 0.35; \quad (3)$$

$$0.35 < H1'/f1 < 0.6; \quad (4)$$

$$0.35 < |f2|/\sqrt{(fW \cdot fT)} < 0.55; \quad (5)$$

$$3.5 < f3/fW < 9; \quad (6)$$

$$4.5 < |f4|/fW < 10; \quad (7)$$

$$4 < f5/fW < 8; \text{ and} \quad (8)$$

$$1.0 < |D4W/f4| < 1.3, \quad (9)$$

where:
f1 is a focal length of the first lens group;
f1F is a synthetic focal length of the concave lens group closest to the object side of the first lens group and the convex lens with a strong convexity facing toward the image side;
dp is a thickness of the convex lens with a strong convexity facing toward the image side of the first lens group (provided, if the first lens group includes a prism that refracts an optical path by reflection, dp is a sum of the thickness of the prism and that of the convex lens with a strong convexity facing toward the image side);
H1' is a distance from a vertex of a surface closest to the image side of the first lens group to an image side principal point of the first lens group ("−" indicates the object side, and "+" indicates the image side);
fW is a focal length of the overall system at a wide angle end;
fT is a focal length of the overall system at a telephoto end;
fi is a focal length of the i-th lens group;
D4W is spacing between the fourth lens group and the fifth lens group when focusing on an infinite object at the wide angle end.

The conditional expression (1), which is applied to a case where the first lens group includes no prism for refracting an optical path by reflection, or the conditional expression (1'), which is applied to a case where the first lens group includes a prism for refracting an optical path by reflection, defines a condition for obtaining a configuration close to an afocal system having an angular magnification of less than 1, by using a concave lens group made up of one or more lenses and a convex lens with a strong convexity facing toward an image side. Here, the configuration close to the afocal system, which is made up of the concave lens group and the convex lens, is referred to as a front group of the first lens group, and the subsequent lens configuration as a rear group of the first lens group. When the afocal characteristic of the front group is destroyed to have negative refracting power, the positive refracting power of the rear group may be enhanced, so that it becomes less difficult to correct spherical aberration and coma aberration at a telephoto side than a middle focal length region in zooming. Conversely, when the afocal characteristic of the front group is destroyed to have positive refracting power, the spherical aberration due to the convex lens with the strong convexity toward the image side of the front group becomes large, and the correction therefore becomes difficult. Additionally, if the front group has a strong refracting power exceeding the range of the above conditional expression, then deterioration of aberration against error factors such as decentering becomes sensitive, and the deterioration of yield is apt to occur. In the embodiments in which the first lens group includes the prism for refracting an optical path by reflection, the front group of the first lens group including this prism is brought into a configuration close to an afocal system, in addition to the above-mentioned concave lens group and the convex lens with the strong convexity facing toward the image side.

The conditional expression (2) defines a condition for more sufficiently minimizing the front lens diameter than has hitherto been possible when the angular magnification of an afocal section of the front group in the first lens group is set suitably. By filling with glass between a component having negative refracting power and a component having positive refracting power, which constitute the afocal section, the inclination of a principal ray within the afocal section can be further reduced, thereby enabling to effectively miniaturize the front lens diameter. Below a lower limit of the conditional expression (2), it is unavoidable to widen the air spacing between the component having negative refracting power and the component having positive refracting power, both of which constitute the afocal section. This increases the inclination of the principal ray within the air spacing, so that the front lens diameter is increased. Above an upper limit of the conditional expression (2), the entire length of the afocal section is elongated, failing to effectively minimize the front lens diameter.

The conditional expressions (3) and (4) are to define a condition for obtaining excellent aberration correction while achieving not less than 80° or not less than 90° in the angle of view at a wide angle end. To achieve an ultra-wide-angle, it is desirable to have such a refracting power arrangement that an image-side principal point of the first lens group projects sufficiently to the image side of a surface closest to the image side of the first lens group, namely, to establish a retro-focus type lens when viewing the first lens group alone. Specifically, to achieve the angle of view of not less than 80°, it is desirable that a concave lens group closest to the object side is composed of a concave single lens, and the conditional expression (3) is satisfied. To achieve the angle of view of not less than 90°, it is desirable that the concave lens group closest to the object side is composed of two concave lenses, and the conditional expression (4) is satisfied.

The conditional expression (5) is to define the power of the second lens group that is the main variable power lens group. A proper selection of its range enables one to effectively achieve a high zoom ratio. Specifically, below the lower limit of the conditional expression (5), the power of the second lens group becomes too strong. As a result, Petzval sum becomes great toward the negative side, and the image surface becomes "over" (excess correction). In addition to this, sensitivity is increased so that fuzziness and image fluctuation are apt to occur. This complicates the mechanism configuration, which is unfavorable.

Above the upper limit of the conditional expression (5), the power of the second group is weakened. To achieve a desirable variable power ratio, it is unavoidable to increase the amount of movement of the second lens group, thus leading to enlargement of the whole zoom lens, which is unfavorable.

Preferably, the third, fourth, and fifth lens groups satisfy the conditional expressions (6), (7), and (8), respectively.

Below a lower limit of the conditional expressions (6) and (7), the bundle of rays to be outputted from the third lens group substantially becomes an afocal bundle of rays, and it is, therefore, difficult to ensure back focus. This produces the unfavorable consequences that dust adhering to the lenses constituting the fourth lens group is noticeable, and that it is quite difficult to accommodate a block such as a filter. Above an upper limit, the necessary amount of movement of the fourth lens group for focusing is increased to enlarge the overall zoom lens, which is unfavorable.

The conditional expressions (6) to (8) are to define the power of lens groups disposed from a diaphragm to the image side. The ranges, defined by the respective conditional expressions, define a condition for setting the exit pupil position of the zoom lens so as not to be too short and further, for letting an off-axis bundle of rays from the object side in the exit pupil at a small angle so as to contribute to miniaturization of the front lens diameter, as above described.

Above the upper limit of the conditional expressions (6) to (8), the incidence angle of the above-mentioned off-axis bundle of rays to the exit pupil cannot be set to a small angle, resulting in an increase in the front lens diameter. Below a lower limit, the exit pupil becomes too short to the plus side, so that a telecentric bundle of rays for a solid image sensor can not be ensured and aberration variations for focus expand, which are both unfavorable. Setting the respective values within the ranges defined in the conditional expressions (6) to (8) permits miniaturization with less movement at the time of focusing. Exceeding the respective ranges of the conditional expressions (6) to (8) may result in the front lens diameter enlarging and the entire system also enlarging; and moreover, it is difficult to set a proper exit angle with respect to a camera system.

The conditional expression (9) relates to the refracting power and the moving space of the fourth lens group. Below a lower limit of the conditional expression (9), it becomes difficult to ensure the amount of movement for focusing, and the focusing to a near object becomes difficult. Above an upper limit of the conditional expression (9), it is easy to perform focusing, but it is unfavorable because the entire lens system is enlarged. Meanwhile, a zoom lens of rear focus system has such a characteristic that the feeding amount of the fourth lens group as a focus lens expands more on a telephoto side than a wide angle end. In particular, this tendency becomes significant as the zoom ratio is increased. Hence, for the zoom lens of the present invention having a high zoom ratio, it is preferred to fall in the range of the above-mentioned conditional expression.

Embodiments of the zoom lens of the present invention will next be described.

Figure 2:
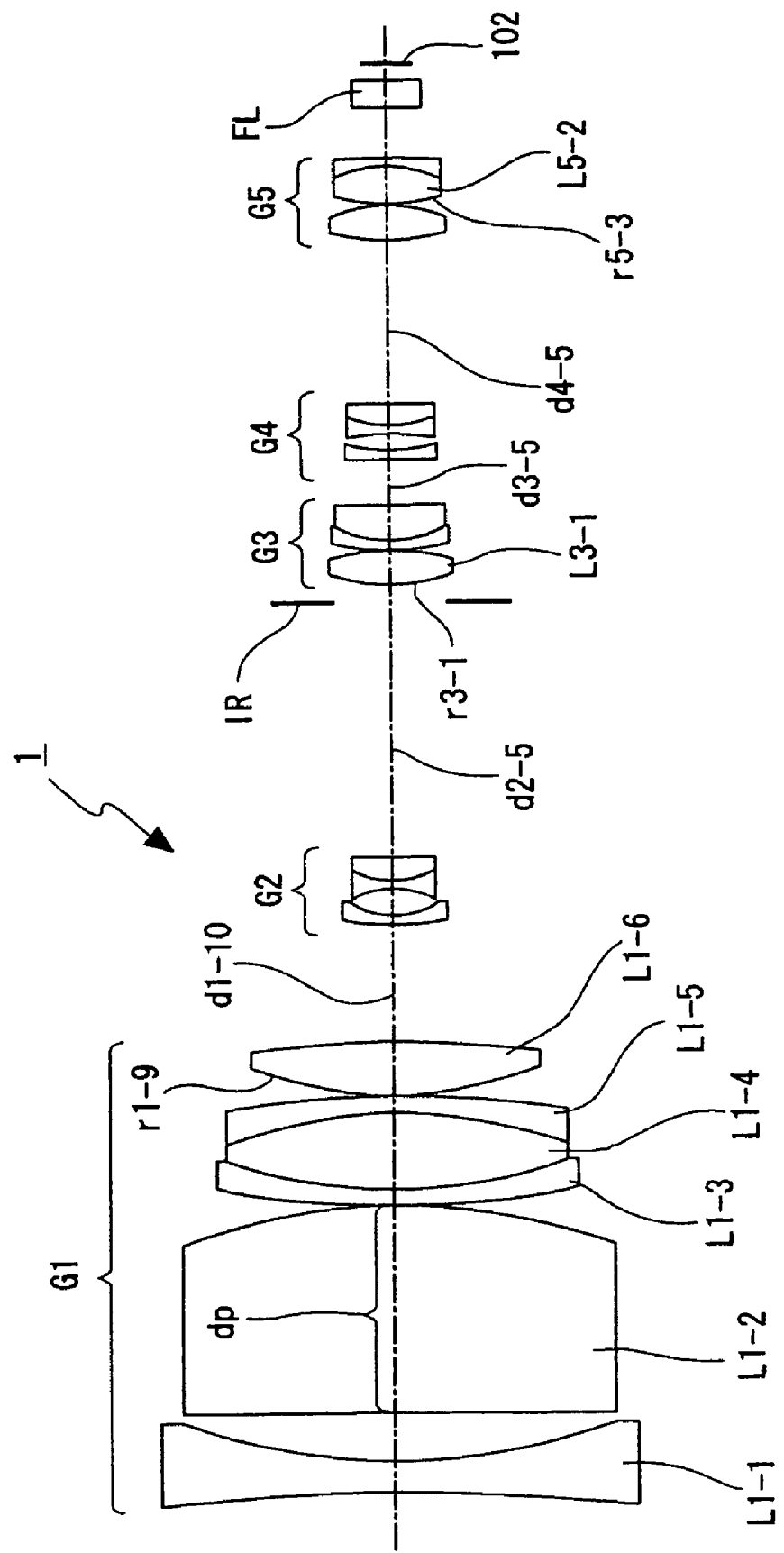
FIG. 2 shows a first embodiment of a zoom lens of the present invention, together with FIG. 3 to FIG. 5, and particularly shows a schematic view of a lens configuration.

FIG. 2 to FIG. 5 show a first embodiment of the zoom lens of the present invention. FIG. 2 shows a lens configuration of the zoom lens 1.

As shown in FIG. 2, the zoom lens 1 is made up of: a first lens group G1 having positive refracting power; a second lens group G2 having negative refracting power; a third lens group G3 having positive refracting power; a fourth lens group G4 having negative refracting power; and a fifth lens group G5 having positive refracting power, which are disposed in this order from an object side. The first lens group G1, the third lens group G3, and the fifth lens group G5 are stationary. The second lens group G2 is shifted in an optical axis direction so as to mainly perform variable power, and the fourth lens group G4 is shifted in the optical axis direction so as to perform correction for image position fluctuations and focusing.

The first lens group G1 is configured by disposing, in order from the object side, a concave lens L1-1; a convex lens L1-2 with a strong convexity facing toward an image side; a triple-cemented lens made up of a concave meniscus lens L1-3 with a convexity to an object side, a double convex lens L1-4 having Abbe number vd not less than 84, and a concave meniscus lens L1-5 with a concavity facing toward the object side; and a convex lens L1-6 with a strong convexity toward the object side, wherein a surface on the object side of the convex lens L1-6 is composed of an aspheric surface.

A diaphragm IR is disposed on the object side of the third lens group G3, and a filter FL is disposed between the fifth lens group G5 and an image sensor 102.

In the present specification, an aspherical shape is to be defined by the following Equation 1:

$$xi\text{-}j = H^2/ri\text{-}j\{1+\sqrt{(1-H^2/ri\text{-}j^2)}\} + \Sigma AkH^k,$$

where:

"xi–j" is a depth of an aspherical surface; and

"H" is a height from an optical axis.

Table 1 indicates the data of a numerical value embodiment 1, in which the zoom lens 1 is embodied. All of the following numerical value embodiments are expressed in units such that a focal length fW at a wide angle end is normalized to be 1.

In the following explanation, "ri–j" indicates the radius of curvature of the j-th surface when counted from the object side of the i-th lens group Gi; "di–j" indicates surface spacing between the j-th surface and the (j+1)-th surface when counted from the object side of the i-th lens group Gi; "dFL" indicates surface spacing of the filter FL; "ni–j" indicates a refractive index on a d-line of a material constituting the j-th lens when counted from the object side of the i-th lens group Gi; "nFL" indicates a refractive index on a d-line of a material constituting the filter FL; "vi–j" indicates an Abbe number of a material constituting the j-th lens when counted from the object side of the i-th lens group Gi; and "vFL" indicates an Abbe number of a material constituting the filter FL.

TABLE 1

| r1-1 = −87.343 | d1-1 = 1.219 | n1-1 = 1.83481 | v1-1 = 42.7 |
|---|---|---|---|
| r1-2 = 22.014 | d1-2 = 2.031 | | |
| r1-3 = ∞ | d1-3 = 8.222 | n1-2 = 1.65844 | v1-2 = 50.9 |
| r1-4 = −23.360 | d1-4 = 0.135 | | |
| r1-5 = 37.034 | d1-5 = 0.609 | n1-3 = 1.80610 | v1-3 = 33.3 |
| r1-6 = 18.731 | d1-6 = 3.031 | n1-4 = 1.45650 | v1-4 = 90.3 |
| r1-7 = −18.731 | d1-7 = 0.309 | n1-5 = 1.80610 | v1-5 = 33.3 |
| r1-8 = −37.034 | d1-8 = 0.135 | | |
| r1-9 = 13.127 | d1-9 = 2.065 | n1-6 = 1.58313 | v1-6 = 59.5 |
| r1-10 = −52.873 | d1-10 = variable | | |
| r2-1 = 18.159 | d2-1 = 0.339 | n2-1 = 1.88300 | v2-1 = 40.8 |
| r2-2 = 3.132 | d2-2 = 1.048 | | |
| r2-3 = −3.869 | d2-3 = 0.339 | n2-2 = 1.77250 | v2-2 = 49.6 |
| r2-4 = 3.782 | d2-4 = 0.969 | n2-3 = 1.92286 | v2-3 = 20.9 |
| r2-5 = −512.909 | d2-5 = variable | | |
| r diaphragm = ∞ | d diaphragm = 0.745 | | |
| r3-1 = 7.484 | d3-1 = 1.235 | n3-1 = 1.58313 | v3-1 = 59.5 |
| r3-2 = −11.869 | d3-2 = 0.135 | | |
| r3-3 = 9.758 | d3-3 = 0.339 | n3-2 = 1.84666 | v3-2 = 23.8 |
| r3-4 = 4.507 | d3-4 = 1.444 | n3-3 = 1.51680 | v3-3 = 64.2 |
| r3-5 = −15.666 | d3-5 = variable | | |
| r4-1 = 123.100 | d4-1 = 0.339 | n4-1 = 1.77250 | v4-1 = 49.6 |
| r4-2 = 9.311 | d4-2 = 0.594 | | |
| r4-3 = −9.4595 | d4-3 = 0.339 | n4-2 = 1.80610 | v4-2 = 40.7 |
| r4-4 = 4.883 | d4-4 = 0.928 | n4-3 = 1.84666 | v4-3 = 23.8 |
| r4-5 = −76.721 | d4-5 = variable | | |
| r5-1 = 10.920 | d5-1 = 1.221 | n5-1 = 1.48749 | v5-1 = 70.4 |
| r5-2 = −6.918 | d5-2 = 0.135 | | |
| r5-3 = 6.155 | d5-3 = 1.527 | n5-2 = 1.58313 | v5-2 = 59.5 |
| r5-4 = −4.780 | d5-4 = 0.339 | n5-3 = 1.92286 | v5-3 = 20.9 |
| r5-5 = −22.568 | d5-5 = 1.677 | | |
| filter = ∞ | dFL = 1.070 | nFL = 1.51680 | vFL = 64.2 |
| ∞ | back focus 1.000 | | |

In the zoom lens 1, surface spacing d1-10 between the first lens group G1 and the second lens group G2, surface spacing d2-5 between the second lens group G2 and the diaphragm IR, surface spacing d3-5 between the third lens group G3 and the fourth lens group G4, and surface spacing d4-5 between the fourth lens group G4 and the fifth lens group G5 are variable. Table 2 shows the wide angle ends of the above respective surface spacing, the middle focal lengths between a wide angle end and a telephoto end, and the respective values at a telephoto end in the numerical value embodiment 1, together with a focal length, an F-number, and an angle of view (2ω).

TABLE 2

| Focal Length | 1.000 | 17.573 | 35.189 |
|---|---|---|---|
| F number | 1.85 | 3.05 | 4.47 |
| 2ω(°) | 84.0 | 5.38 | 2.62 |
| d1-10 | 0.474 | 12.189 | 14.145 |
| d2-5 | 14.581 | 2.866 | 0.910 |
| d3-5 | 0.745 | 7.076 | 0.844 |
| d4-5 | 7.651 | 1.320 | 7.552 |

In the zoom lens 1, a surface r1-9 on the object side of a double convex lens L1-6 positioned closest to the image side of the first lens group G1, a surface r3-1 on the object side of a lens L3-1 positioned closest to the object side of the third lens group G3, and a surface r5-3 on the object side of a second lens L5-2 of the fifth lens group G5 are respectively composed of an aspheric surface. Table 3 shows the fourth-order, sixth-order, and eighth-order aspheric surface factors A4, A6, and A8 of the above respective surfaces in the numerical value embodiment 1.

TABLE 3

| Aspheric Surface Factor | A4 | A6 | A8 |
|---|---|---|---|
| r1-9 | −0.2780e−4 | −0.1809e−6 | −0.1026e−8 |
| r3-1 | −0.9830e−3 | +0.7828e−5 | −0.3067e−6 |
| r5-3 | −0.5283e−3 | +0.1664e−4 | −0.7667e−6 |

Figure 3:
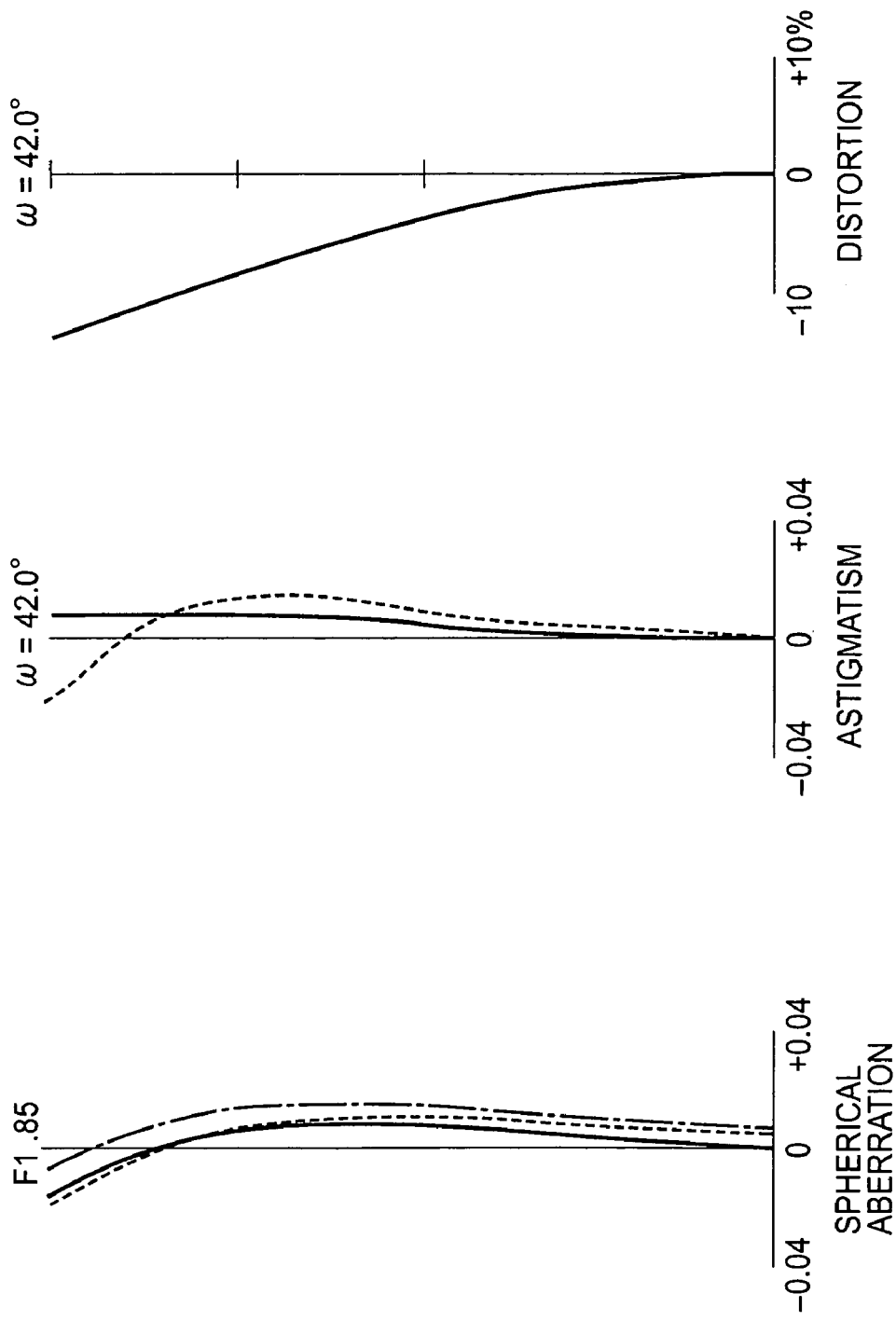
FIG. 3 shows various aberrations in a numerical value embodiment 1 to which specific numerical values are applied in the first embodiment, together with FIG. 4 and FIG. 5, and particularly shows spherical aberration, astigmatism and distortion at a wide angle end.
Figure 4:
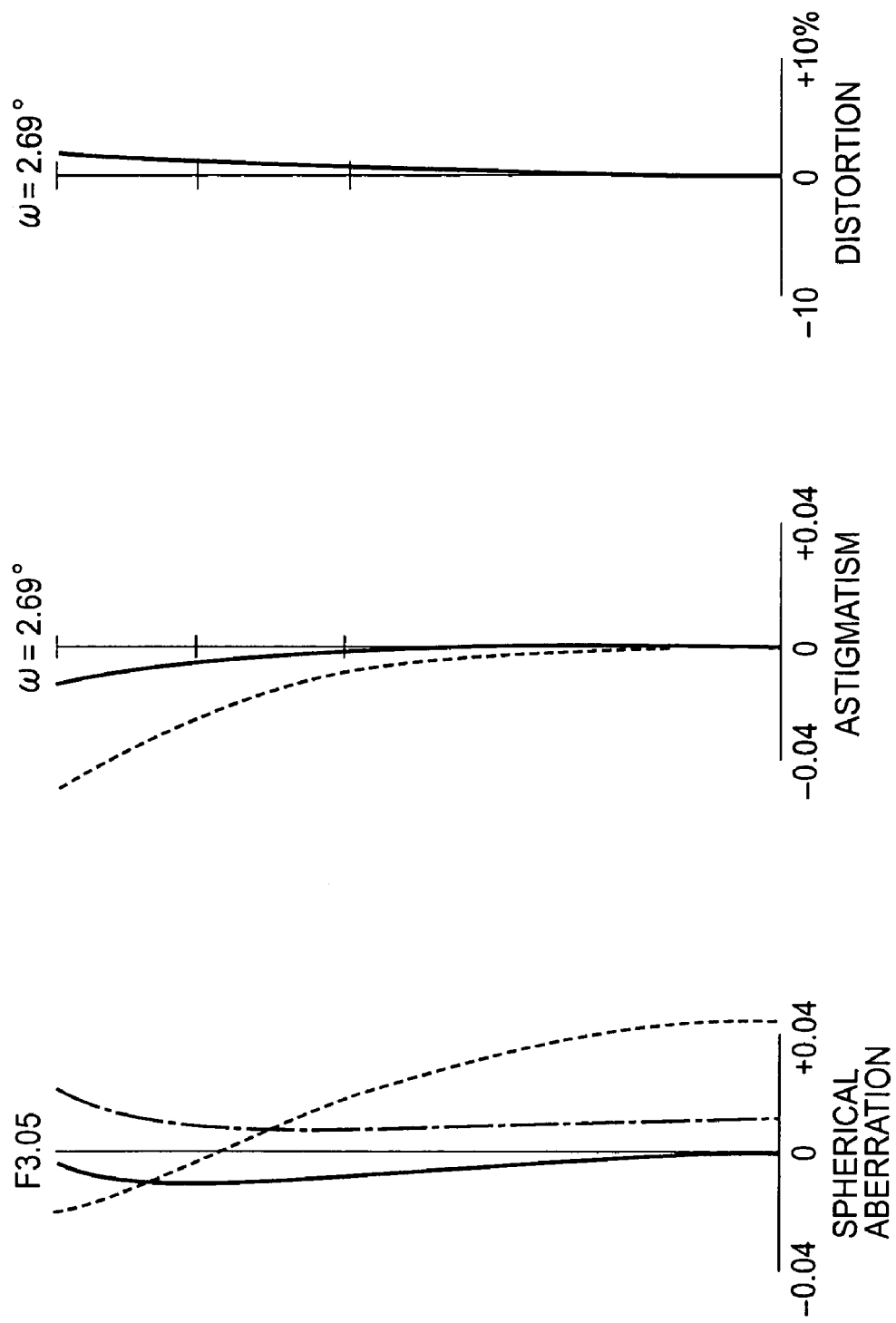
FIG. 4 shows spherical aberration, astigmatism and distortion at a middle focal position between the wide angle end and a telephoto end.
Figure 5:
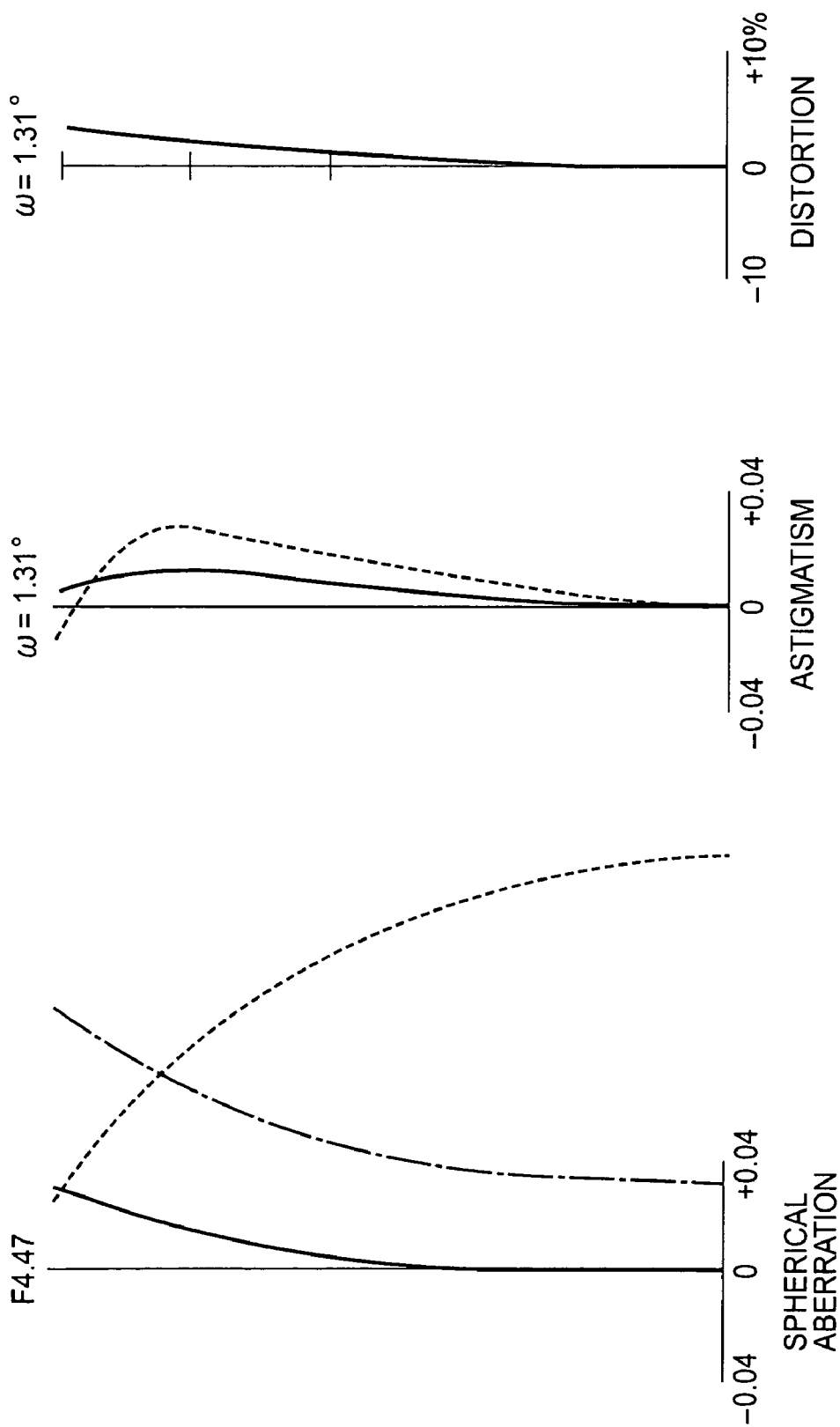
FIG. 5 shows spherical aberration, astigmatism and distortion at the telephoto end.

FIG. 3 to FIG. 5 illustrate the spherical aberration, the astigmatism, and the distortion at a wide angle end, a middle focal position between a wide angle end and a telephoto end, and a telephoto end in the numerical value embodiment 1. In the spherical aberration diagram, the solid line indicates an aberration curve on a d-line (587.6 nm in wavelength); the broken line indicates an aberration curve on a g-line (435.8 nm in wavelength); and the alternate long and short dash line indicates an aberration curve on a C-line (656.3 nm in wavelength). In the astigmatism diagram, the solid line indicates a sagittal image surface; and the broken line indicates a meridional image surface.

Figure 6:
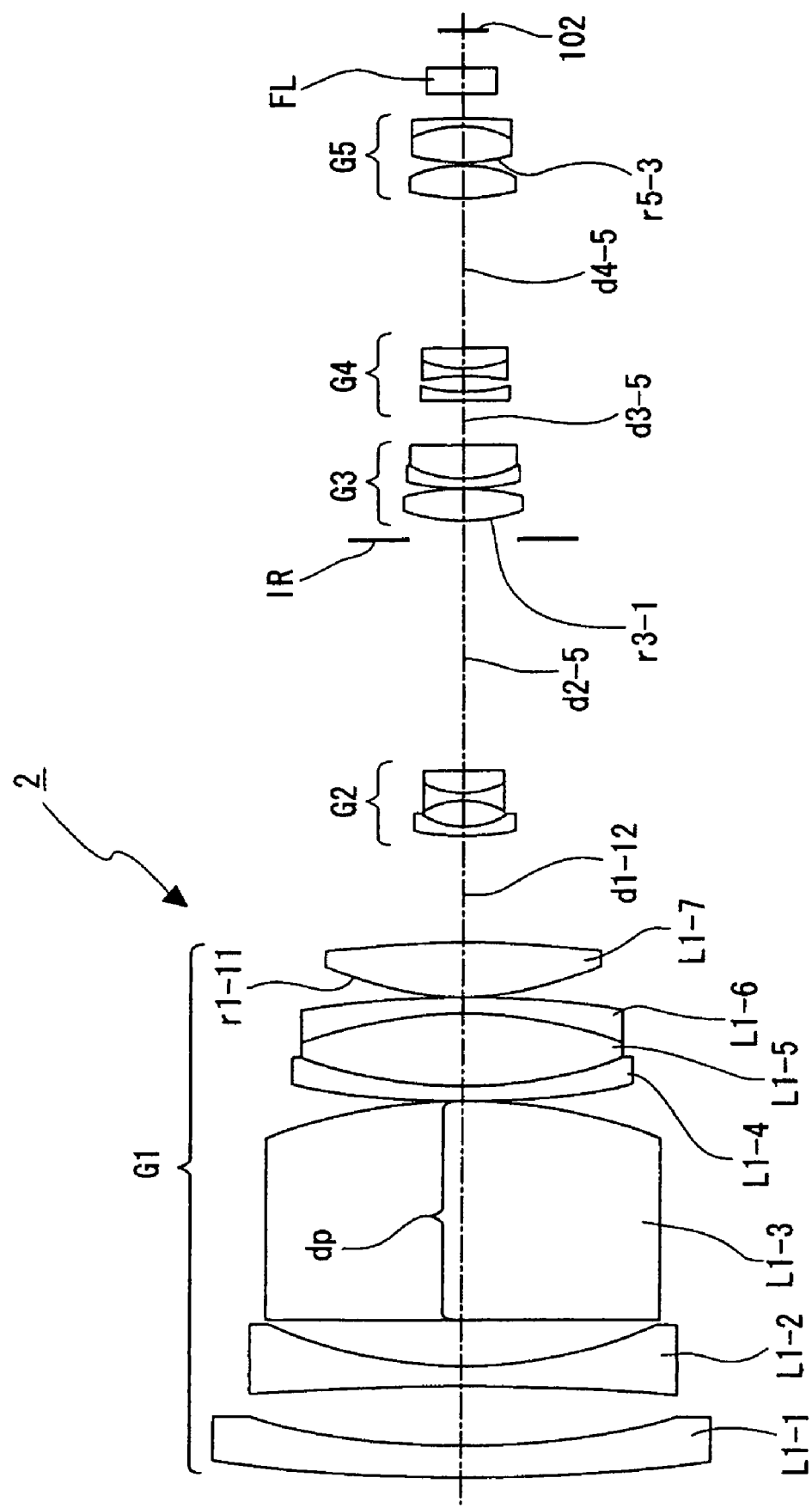
FIG. 6 shows a second embodiment of the zoom lens of the present invention, together with FIG. 7 to FIG. 9, and particularly shows a schematic view of a lens configuration.

FIG. 6 to FIG. 9 show a second embodiment of the zoom lens of the present invention. FIG. 6 shows a lens configuration of the zoom lens 2.

As shown in FIG. 6, the zoom lens 2 is made up of: a first lens group G1 having positive refracting power; a second lens group G2 having negative refracting power; a third lens group G3 having positive refracting power; a fourth lens group G4 having negative refracting power; and a fifth lens group G5 having positive refracting power, which are disposed in this order from an object side. The first lens group G1, the third lens group G3, and the fifth lens group G5 are stationary. The second lens group G2 is shifted in an optical axis direction so as to mainly perform variable power, and the fourth lens group G4 is shifted in the optical axis direction so as to perform correction for image position fluctuations and focusing.

The first lens group G1 is configured by disposing, in order from the object side, a concave lens L1-1; a concave lens L1-2; a convex lens L1-3 with a strong convexity facing toward an image side; a triple-cemented lens made up of a concave meniscus lens L1-4 with a convexity toward the object side, a double convex lens L1-5 having an Abbe number vd not less than 84, and a concave meniscus lens L1-6 with a concavity facing toward the object side; and a convex lens L1-7 with a strong convexity toward the object side, wherein a surface on the object side of the convex lens L1-7 is composed of an aspheric surface.

A diaphragm IR is disposed on the object side of the third lens group G3, and a filter FL is disposed between the fifth lens group G5 and an image sensor 102.

Table 4 indicates the data of a numerical value embodiment 2 in which the zoom lens 2 is embodied.

TABLE 4

| | | | |
|---|---|---|---|
| r1-1 = 103.258 | d1-1 = 1.543 | n1-1 = 1.69680 | v1-1 = 55.5 |
| r1-2 = 39.635 | d1-2 = 2.882 | | |
| r1-3 = −100.194 | d1-3 = 1.080 | n1-2 = 1.83481 | v1-2 = 42.7 |
| r1-4 = 22.975 | d1-4 = 2.260 | | |
| r1-5 = ∞ | d1-5 = 10.798 | n1-3 = 1.69680 | v1-3 = 55.5 |
| r1-6 = −23.415 | d1-6 = 0.154 | | |
| r1-7 = 46.145 | d1-7 = 0.694 | n1-4 = 1.80610 | v1-4 = 33.3 |
| r1-8 = 21.199 | d1-8 = 3.473 | n1-5 = 1.45650 | v1-5 = 90.3 |
| r1-9 = −21.199 | d1-9 = 0.694 | n1-6 = 1.80610 | v1-6 = 33.3 |
| r1-10 = −46.145 | d1-10 = 0.154 | | |
| r1-11 = 14.577 | d1-11 = 2.618 | n1-7 = 1.58313 | v1-7 = 59.5 |
| r1-12 = −41.930 | d1-12 = variable | | |
| r2-1 = 17.617 | d2-1 = 0.386 | n2-1 = 1.88300 | v2-1 = 40.8 |
| r2-2 = 3.540 | d2-2 = 1.167 | | |
| r2-3 = −4.166 | d2-3 = 0.386 | n2-2 = 1.77250 | v2-2 = 49.6 |
| r2-4 = 4.407 | d2-4 = 1.095 | n2-3 = 1.92286 | v2-3 = 20.9 |
| r2-5 = −175.934 | d2-5 = variable | | |
| r diaphragm = ∞ | d diaphragm = 0.848 | | |
| r3-1 = 8.693 | d3-1 = 1.401 | n3-1 = 1.58313 | v3-1 = 59.5 |
| r3-2 = −13.314 | d3-2 = 0.154 | | |
| r3-3 = 11.263 | d3-3 = 0.386 | n3-2 = 1.84666 | v3-2 = 23.8 |
| r3-4 = 45.205 | d3-4 = 1.626 | n3-3 = 1.51680 | v3-3 = 64.2 |
| r3-5 = −18.169 | d3-5 = variable | | |
| r4-1 = 140.227 | d4-1 = 0.386 | n4-1 = 1.77250 | v4-1 = 49.6 |
| r4-2 = 10.940 | d4-2 = 0.684 | | |
| r4-3 = −10.112 | d4-3 = 0.386 | n4-2 = 1.80610 | v4-2 = 40.7 |
| r4-4 = 5.771 | d4-4 = 1.057 | n4-3 = 1.84666 | v4-3 = 23.8 |
| r4-5 = −51.547 | d4-5 = variable | | |
| r5-1 = 12.440 | d5-1 = 1.437 | n5-1 = 1.48749 | v5-1 = 70.4 |
| r5-2 = −7.348 | d5-2 = 0.154 | | |
| r5-3 = 7.019 | d5-3 = 1.791 | n5-2 = 1.58313 | v5-2 = 59.5 |
| r5-4 = −5.127 | d5-4 = 0.386 | n5-3 = 1.92286 | v5-3 = 20.9 |
| r5-5 = −28.794 | d5-5 = 1.998 | | |
| filter = ∞ | dFL = 1.219 | nFL = 1.51680 | vFL = 64.2 |
| ∞ | back focus 1.000 | | |

In the zoom lens 2, surface spacing d1-12 between the first lens group G1 and the second lens group G2, surface spacing d2-5 between the second lens group G2 and the diaphragm IR, surface spacing d3-5 between the third lens group G3 and the fourth lens group G4, and surface spacing d4-5 between the fourth lens group G4 and the fifth lens group G5 are variable. Table 5 shows the wide angle ends of the above respective surface spacing, the middle focal lengths between a wide angle end and a telephoto end, and the respective values at a telephoto end in the numerical value embodiment 2, together with a focal length, an F-number, and an angle of view (2ω).

TABLE 5

| Focal Length | 1.000 | 17.135 | 34.006 |
|---|---|---|---|
| F number | 1.85 | 3.00 | 4.26 |
| 2ω(°) | 93.6 | 6.28 | 3.06 |
| d1-12 | 0.540 | 13.610 | 15.833 |
| d2-5 | 16.340 | 3.270 | 1.047 |
| d3-5 | 0.848 | 8.282 | 0.945 |
| d4-5 | 8.715 | 1.281 | 8.618 |

In the zoom lens 2, a surface r1-11 on the object side of the double convex lens L1-7 positioned closest to the image side of the first lens group G1, a surface r3-1 on the object side of a lens L3-1 positioned closest to the object side of the third lens group G3, and a surface r5-3 on the object side of a second lens L5-2 of the fifth lens group G5 are respectively composed of an aspheric surface. Table 6 shows the fourth-order, sixth-order, and eighth-order aspheric surface factors A4, A6, and A8 of the above respective surfaces in the numerical value embodiment 2.

TABLE 6

| Aspheric Surface Factor | A4 | A6 | A8 |
|---|---|---|---|
| r1-11 | −0.3091e−4 | −0.1571e−6 | −0.4291e−9 |
| r3-1 | −0.6576e−3 | +0.4603e−5 | −0.1232e−6 |
| r5-3 | −0.2389e−3 | −0.1157e−4 | −0.2912e−6 |

Figure 7:
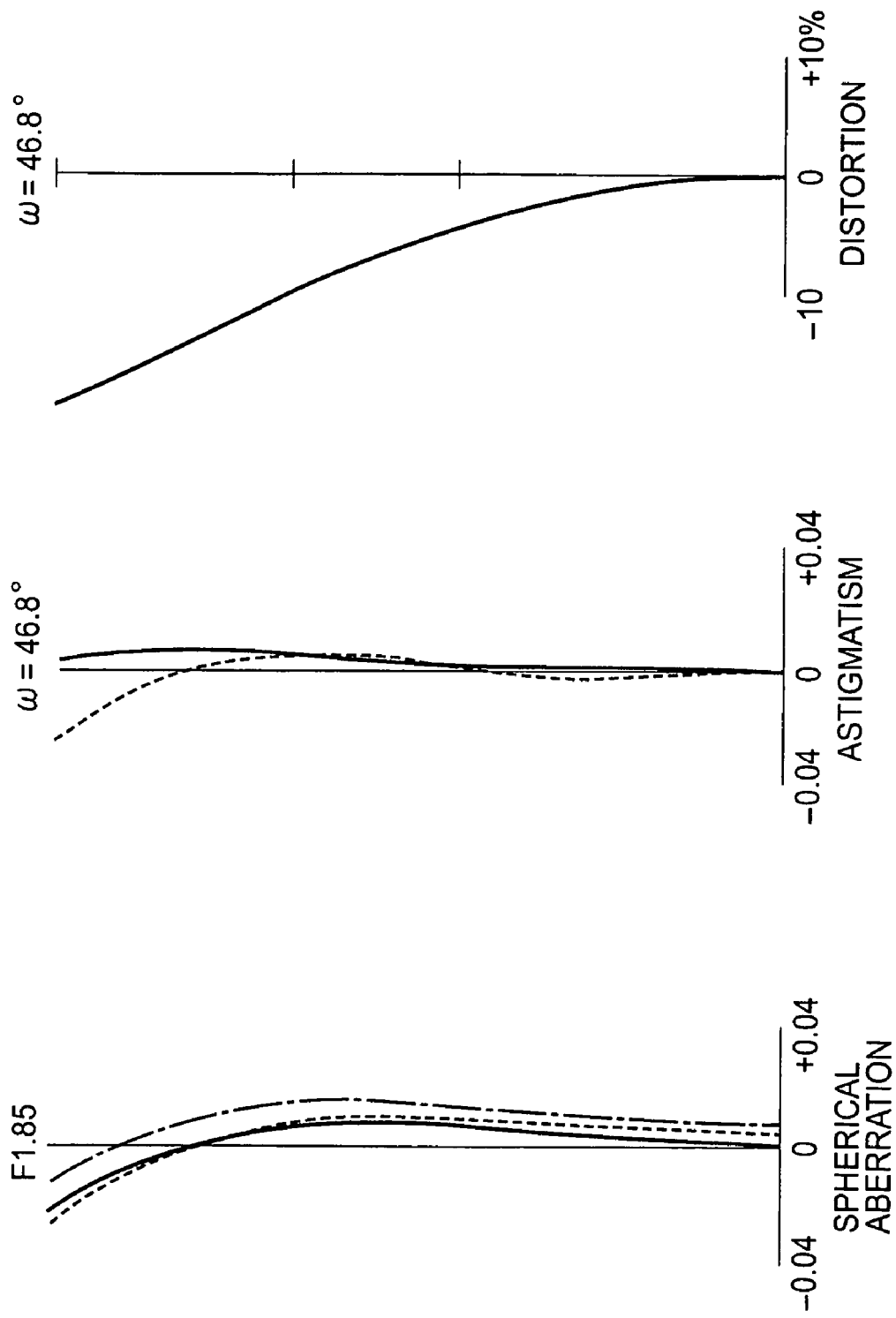
FIG. 7 shows various aberrations in a numerical value embodiment 2 to which specific numerical values are applied in the first embodiment, together with FIG. 8 and FIG. 9, and particularly shows spherical aberration, astigmatism and distortion at a wide angle end.
Figure 8:
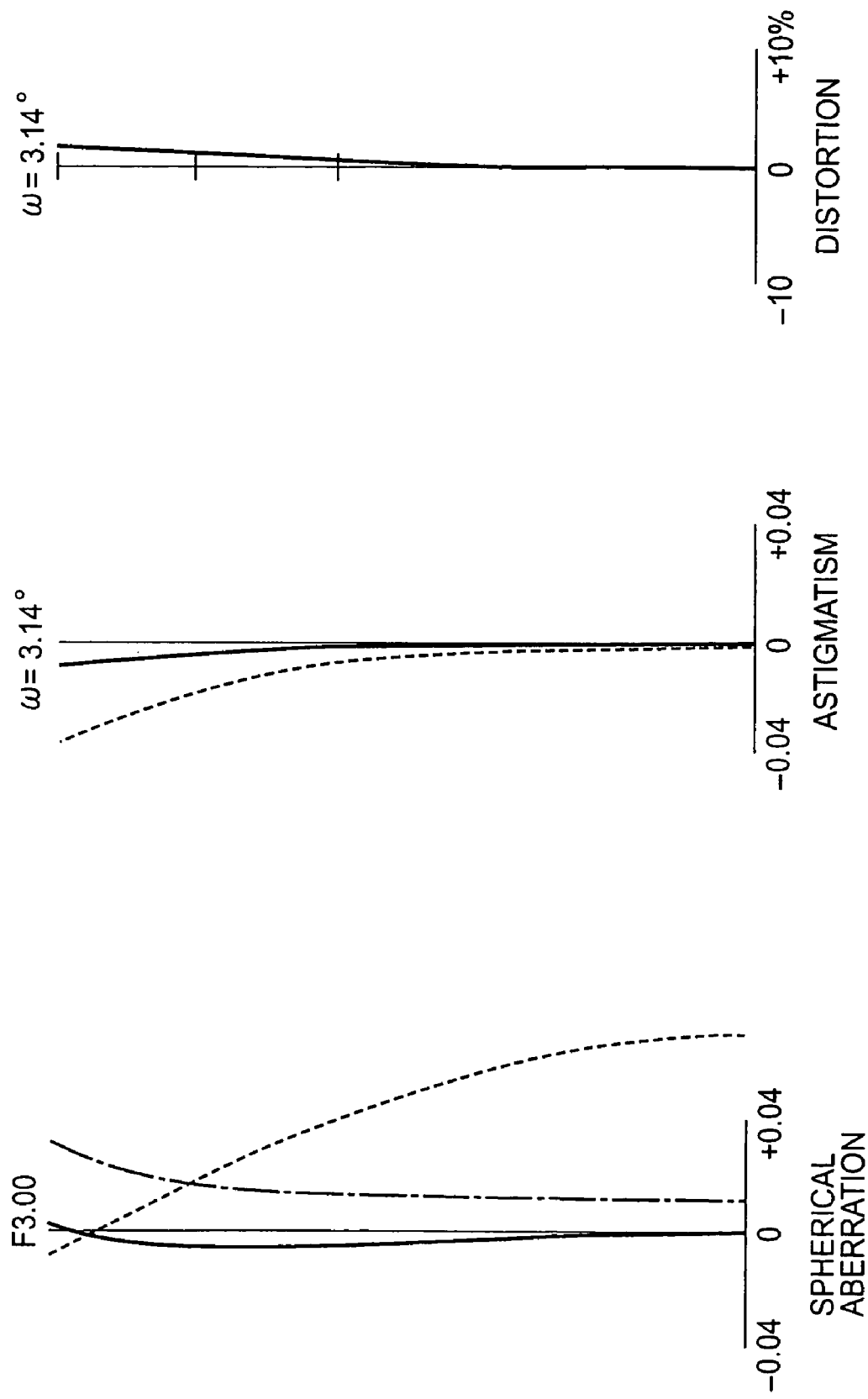
FIG. 8 shows spherical aberration, astigmatism and distortion at a middle focal position between the wide angle end and a telephoto end.
Figure 9:
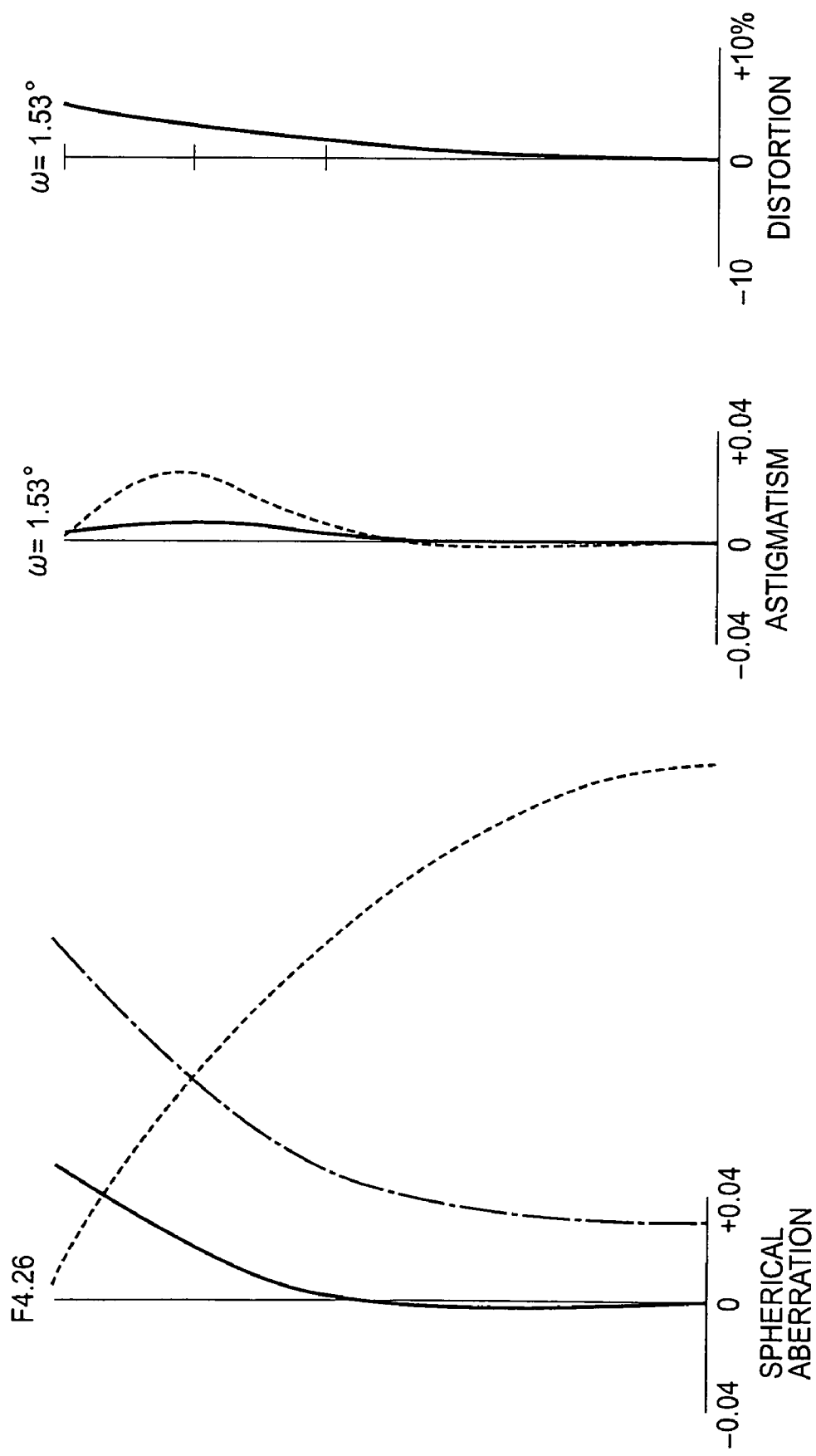
FIG. 9 shows spherical aberration, astigmatism and distortion at the telephoto end.

FIG. 7 to FIG. 9 illustrate the spherical aberration, the astigmatism, and the distortion at a wide angle ends a middle focal position between a wide angle end and a telephoto end, and a telephoto end in the numerical value embodiment 2. In the spherical aberration diagram, the solid line indicates an aberration curve on a d-line (587.6 nm in wavelength); the broken line indicates an aberration curve on a g-line (435.8 nm in wavelength); and the chain line indicates an aberration curve on a C-line (656.3 nm in wavelength). In the astigmatism diagram, the solid line indicates a sagittal image surface; and the broken line indicates a meridional image surface.

Figure 10:
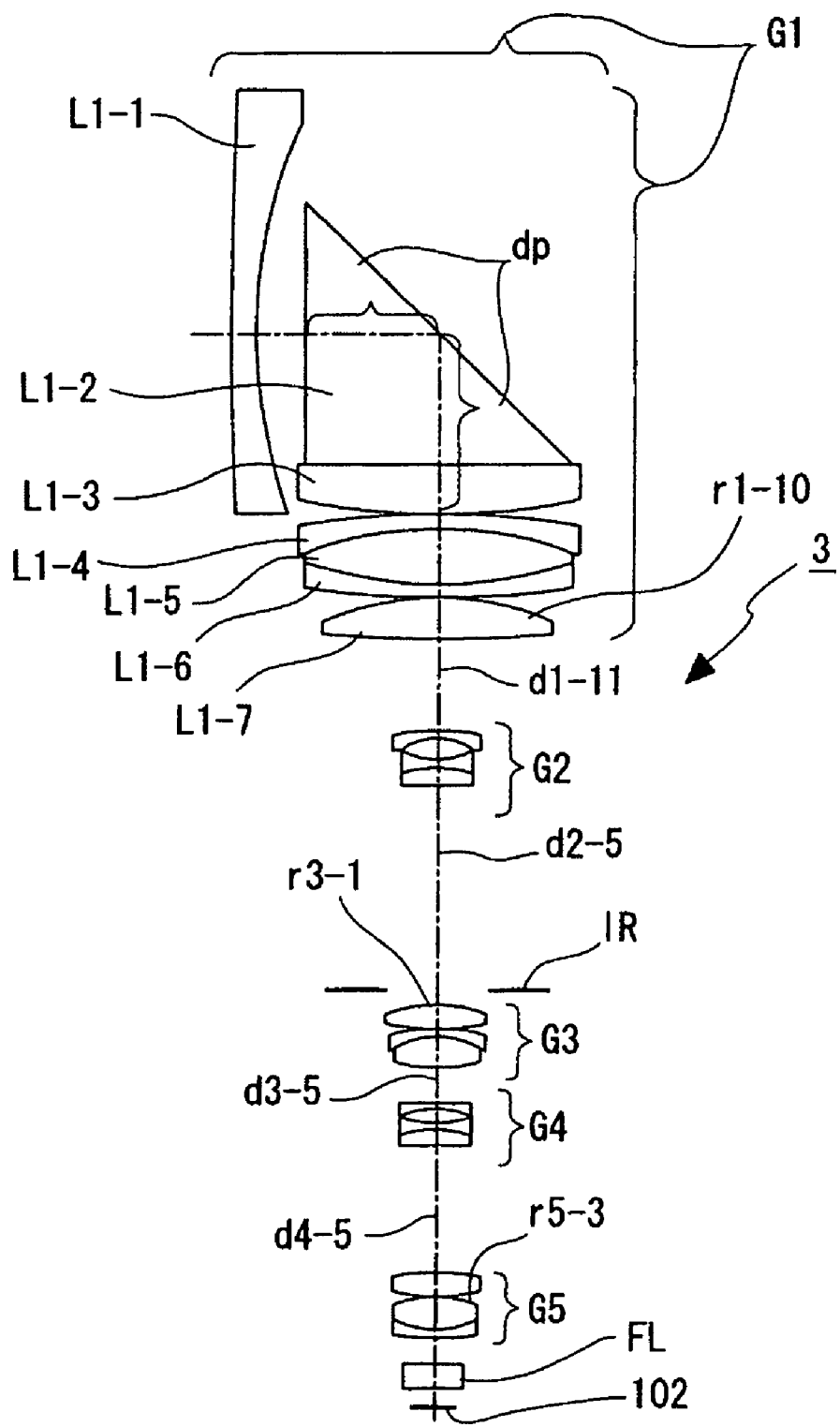
FIG. 10 shows a third embodiment of the zoom lens of the present invention, together with FIG. 11 to FIG. 13, and particularly shows a schematic view of a lens configuration.

FIG. 10 to FIG. 13 show a third embodiment of the zoom lens of the present invention. FIG. 10 shows a lens configuration of a zoom lens 3.

As shown in FIG. 10, the zoom lens 3 is made up of a first lens group G1 having positive refracting power; a second lens group G2 having negative refracting power; a third lens group G3 having positive refracting power; a fourth lens group G4 having negative refracting power; and a fifth lens group G5 having positive refracting power, which are disposed in this order from an object side. The first lens group G1, the third lens group G3, and the fifth lens group G5 are stationary. The second lens group G2 is shifted in an optical axis direction so as to mainly perform variable power, and the fourth lens group G4 is shifted in the optical axis direction so as to perform correction for image position fluctuations and focusing.

The first lens group G1 is configured by disposing, in order from the object side, a concave lens L1-1; a right-angle prism L1-2; a convex lens L1-3 with a strong convexity facing toward an image side; a triple-cemented lens made up of a concave meniscus lens L1-4 with a convexity toward the object side, a double convex lens L1-5 having an Abbe number vd not less than 84, and a concave meniscus lens L1-6 with a concavity facing toward the object side; and a convex lens L1-7 with a strong convexity toward the object side, wherein a surface on the object side of the convex lens L1-7 is composed of an aspheric surface.

A diaphragm IR is disposed on the object side of the third lens group G3, and a filter FL is disposed between the fifth lens group G5 and an image sensor 102.

Table 7 indicates the data of a numerical value embodiment 3 in which the zoom lens 3 is embodied.

TABLE 7

| | | | |
|---|---|---|---|
| r1-1 = 316.787 | d1-1 = 1.222 | n1-1 = 1.83481 | v1-1 = 42.7 |
| r1-2 = 25.664 | d1-2 = 2.699 | | |
| r1-3 = ∞ | d1-3 = 13.475 | n1-2 = 1.56883 | v1-2 = 56.0 |
| r1-4 = ∞ | d1-4 = 2.376 | n1-3 = 1.65844 | v1-3 = 50.9 |
| r1-5 = −34.938 | d1-5 = 0.136 | | |
| r1-6 = 40.992 | d1-6 = 0.611 | n1-4 = 1.80610 | v1-4 = 33.3 |
| r1-7 = 19.398 | d1-7 = 2.943 | n1-5 = 1.45650 | v1-5 = 90.3 |
| r1-8 = −19.398 | d1-8 = 0.611 | n1-6 = 1.80610 | v1-6 = 33.3 |
| r1-9 = −40.992 | d1-9 = 0.136 | | |
| r1-10 = 13.196 | d1-10 = 1.994 | n1-7 = 1.58313 | v1-7 = 59.5 |
| r1-11 = −63.951 | d1-11 = variable | | |
| r2-1 = 14.647 | d2-1 = 0.340 | n2-1 = 1.88300 | v2-1 = 40.8 |
| r2-2 = 3.088 | d2-2 = 1.045 | | |

TABLE 7-continued

| | | | |
|---|---|---|---|
| r2-3 = −3.654 | d2-3 = 0.340 | n2-2 = 1.77250 | v2-2 = 49.6 |
| r2-4 = 3.793 | d2-4 = 0.983 | n2-3 = 1.92286 | v2-3 = 20.9 |
| r2-5 = −174.899 | d2-5 = variable | | |
| r diaphragm = ∞ | d diaphragm = 0.747 | | |
| r3-1 = 7.493 | d3-1 = 1.231 | n3-1 = 1.58313 | v3-1 = 59.5 |
| r3-2 = −12.343 | d3-2 = 0.136 | | |
| r3-3 = 10.045 | d3-3 = 0.340 | n3-2 = 1.84666 | v3-2 = 23.8 |
| r3-4 = 4.571 | d3-4 = 1.456 | n3-3 = 1.51680 | v3-3 = 64.2 |
| r3-5 = −14.388 | d3-5 = variable | | |
| r4-1 = 123.442 | d4-1 = 0.340 | n4-1 = 1.77250 | v4-1 = 49.6 |
| r4-2 = 9.630 | d4-2 = 0.530 | | |
| r4-3 = −10.487 | d4-3 = 0.340 | n4-2 = 1.80610 | v4-2 = 40.7 |
| r4-4 = 4.881 | d4-4 = 0.915 | n4-3 = 1.84666 | v4-3 = 23.8 |
| r4-5 = −166.367 | d4-5 = variable | | |
| r5-1 = 11.246 | d5-1 = 1.188 | n5-1 = 1.48749 | v5-1 = 70.4 |
| r5-2 = −7.270 | d5-2 = 0.136 | | |
| r5-3 = 6.172 | d5-3 = 1.522 | n5-2 = 1.58313 | v5-2 = 59.5 |
| r5-4 = −4.880 | d5-4 = 0.340 | n5-3 = 1.92286 | v5-3 = 20.9 |
| r5-5 = −22.631 | d5-5 = 1.640 | | |
| filter = ∞ | dFL = 1.073 | nFL = 1.51680 | vFL = 64.2 |
| ∞ | back focus | 1.000 | |

In the zoom lens 3, surface spacing d1-11 between the first lens group G1 and the second lens group G2, surface spacing d2-5 between the second lens group G2 and the diaphragm IR, surface spacing d3-5 between the third lens group G3 and the fourth lens group G4, and surface spacing d4-5 between the fourth lens group G4 and the fifth lens group G5 are variable. Table 8 shows the wide angle ends of the above respective surface spacing, the middle focal lengths between a wide angle end and a telephoto end, and the respective values at a telephoto end in the numerical value embodiment 3, together with a focal length, an F-number, and an angle of view (2ω).

TABLE 8

| Focal Length | 1.000 | 17.172 | 35.531 |
|---|---|---|---|
| F number | 1.85 | 2.96 | 4.58 |
| 2ω(°) | 84.0 | 5.52 | 2.62 |
| d1-11 | 0.475 | 12.291 | 14.253 |
| d2-5 | 14.797 | 2.981 | 1.018 |
| d3-5 | 0.747 | 7.011 | 0.847 |
| d4-5 | 7.672 | 1.408 | 7.572 |

In the zoom lens 3, a surface r1-10 on the object side of the double convex lens L1-7 disposed closest to the image side of the first lens group G1, a surface r3-1 on the object side of a lens L3-1 disposed closest to the object side of the third lens group G3, and a surface r5-3 on the object side of a second lens L5-2 of the fifth lens group G5 are respectively composed of an aspheric surface. Table 9 shows the fourth-order, sixth-order, and eighth-order aspheric surface factors A4, A6, and A8 of the above respective surfaces in the numerical value embodiment 3.

TABLE 9

| Aspheric Surface Factor | A4 | A6 | A8 |
|---|---|---|---|
| r1-10 | −0.3262e−4 | −0.1895e−6 | −0.9675e−9 |
| r3-1 | −0.1002e−2 | +0.9642e−5 | −0.3007e−6 |
| r5-3 | −0.4473e−3 | +0.2008e−4 | +0.7519e−6 |

Figure 11:
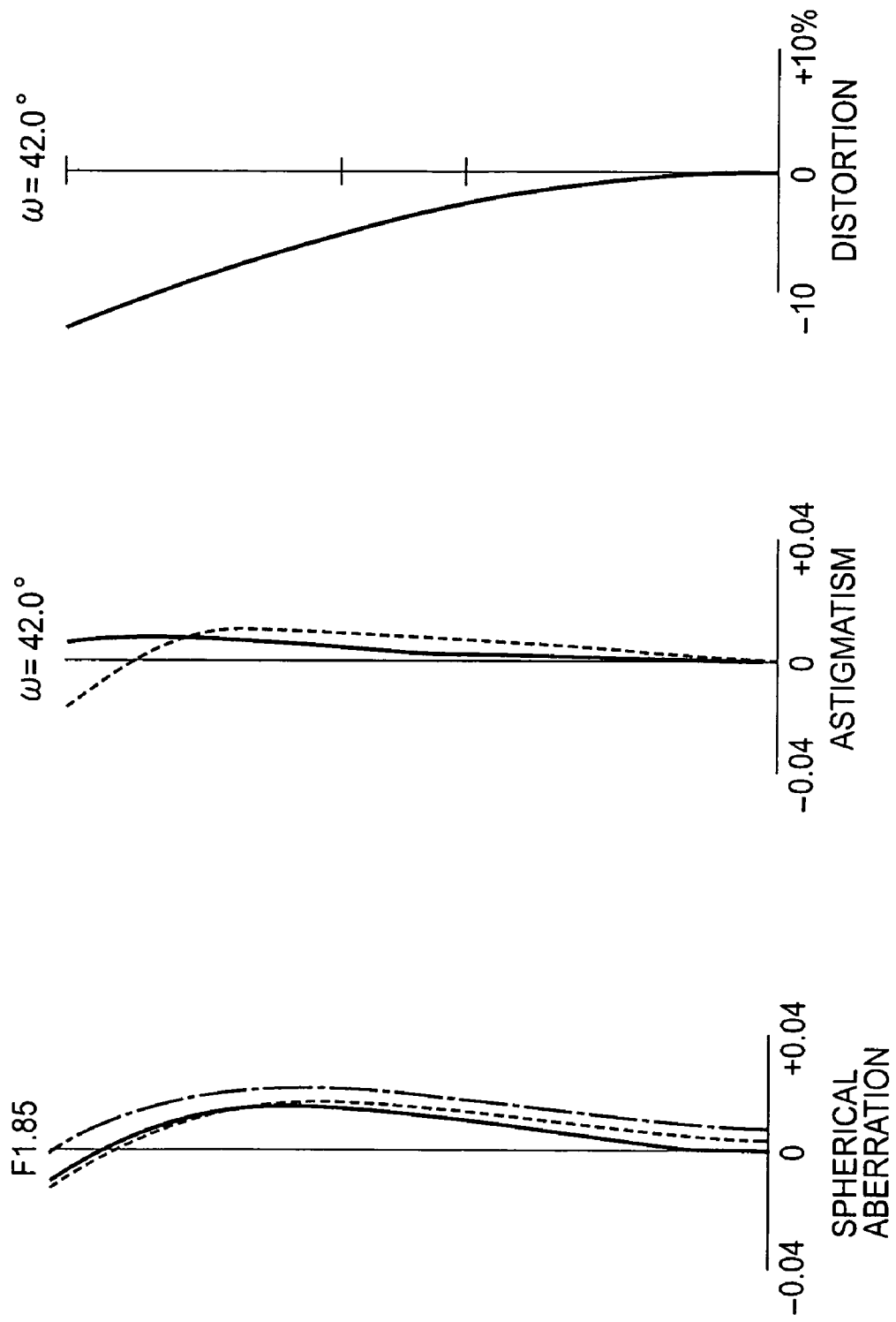
FIG. 11 shows various aberrations in a numerical value embodiment 3 to which specific numerical values are applied in the first embodiment, together with FIG. 12 and FIG. 13, and particularly shows spherical aberration, astigmatism and distortion at a wide angle end.
Figure 12:
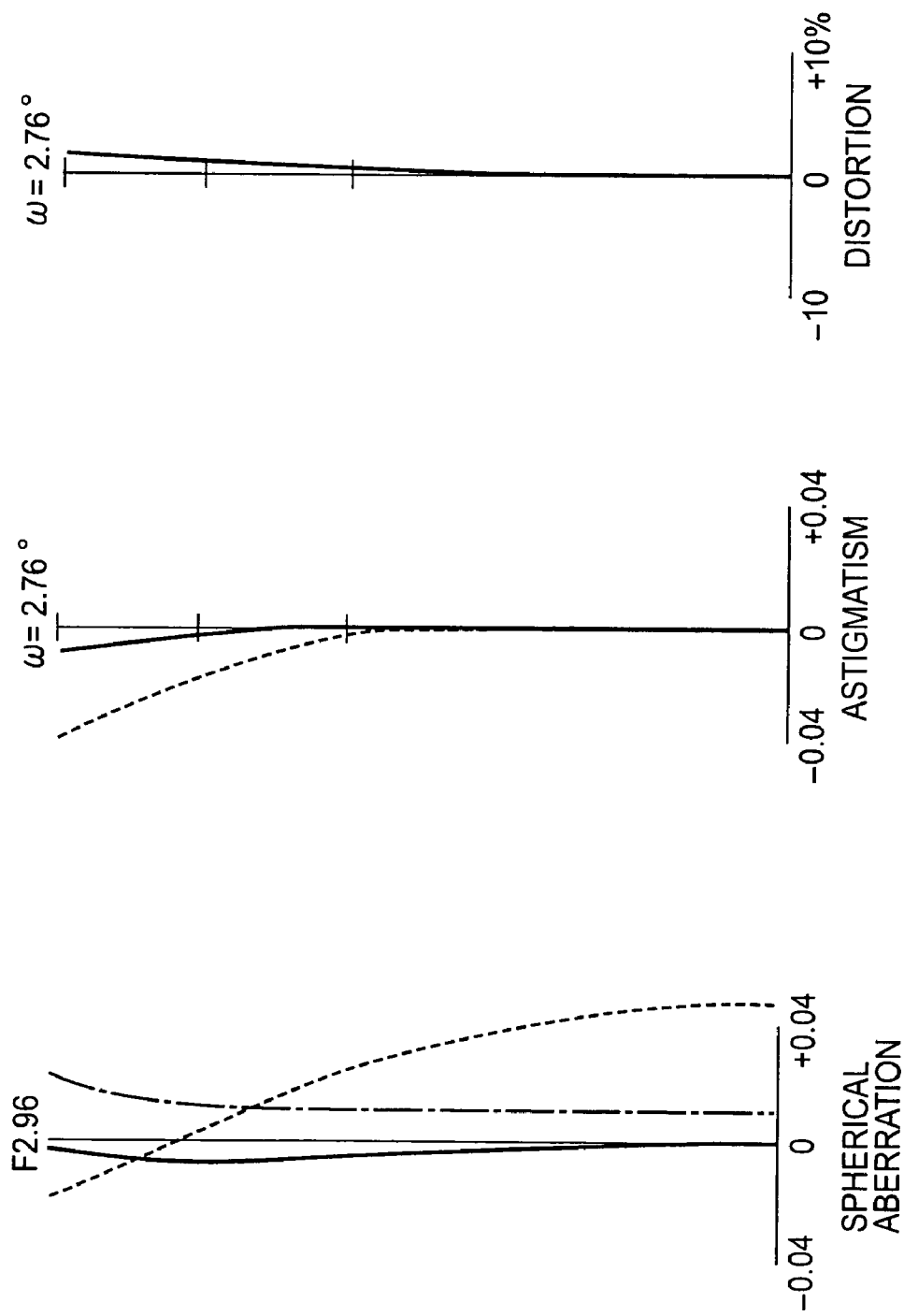
FIG. 12 shows spherical aberration, astigmatism and distortion at a middle focal position between the wide angle end and a telephoto end.
Figure 13:
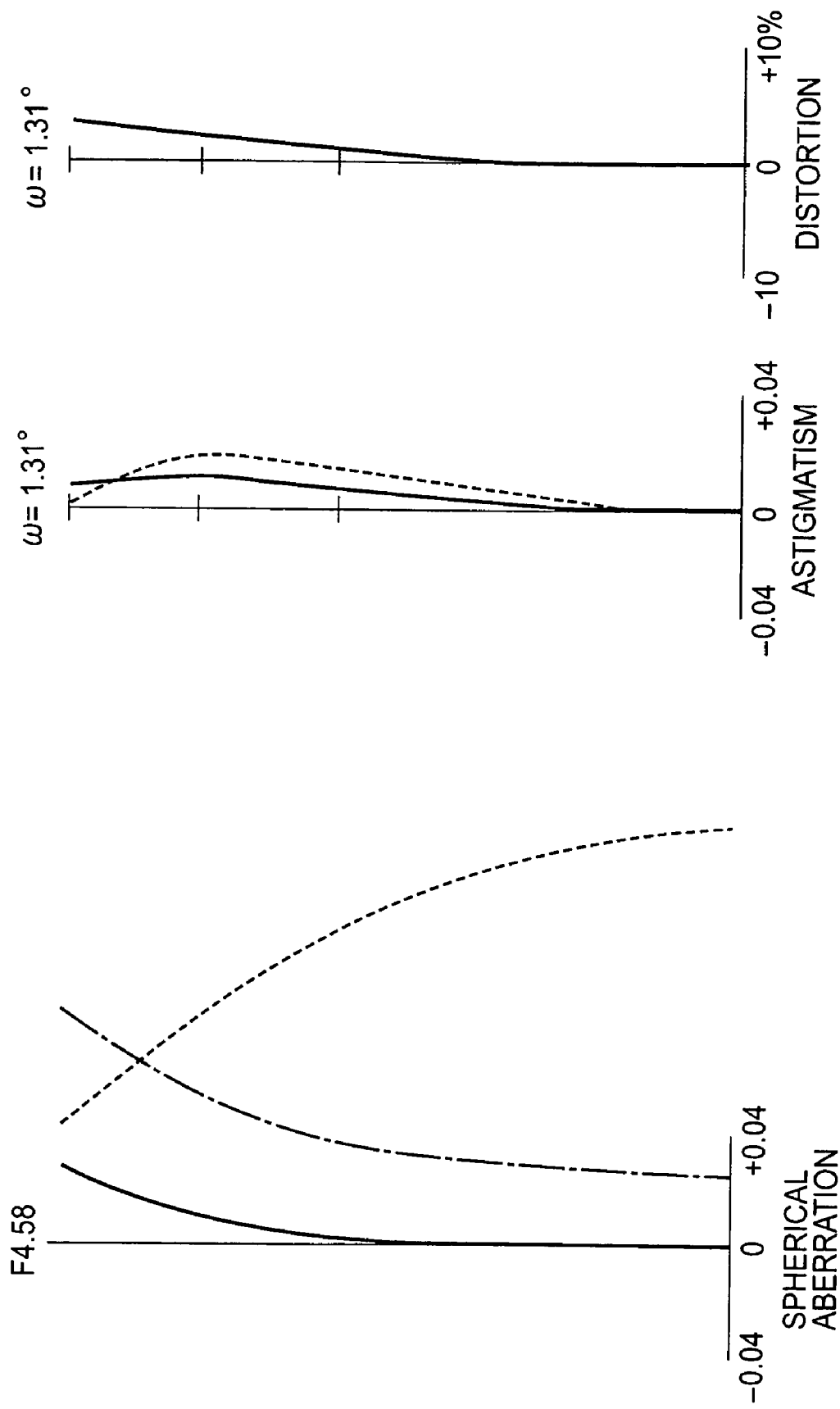
FIG. 13 shows spherical aberration, astigmatism and distortion at the telephoto end.

FIG. 11 to FIG. 13 illustrate the spherical aberration, the astigmatism, and the distortion at a wide angle end, a middle focal position between a wide angle end and a telephoto end, and a telephoto end in the numerical value embodiment 3. In the spherical aberration diagram, the solid line indicates an aberration curve on a d-line (587.6 nm in wavelength); the broken line indicates an aberration curve on a g-line (435.8 nm in wavelength); and the chain line indicates an aberration curve on a C-line (656.3 nm in wavelength). In the astigmatism diagram, the solid line indicates a sagittal image surface; and the broken line indicates a meridional image surface.

Table 10 shows a numerical value corresponding table of the above respective conditional expressions in the above respective numerical value embodiments.

TABLE 10

| | NUMERICAL VALUE EMBODIMENT 1 | NUMERICAL VALUE EMBODIMENT 2 | NUMERICAL VALUE EMBODIMENT 3 |
|---|---|---|---|
| f1 | 13.674 | 13.372 | 13.526 |
| f1F | −100.457 | −87.168 | −258.370 |
| \|f1F\|/f1 | 7.347 | 6.519 | 19.102 |
| dp | 8.222 | 10.798 | 15.851 |
| dp/f1 | 0.601 | 0.808 | 1.172 |
| H1' | 3.830 | 6.303 | 4.112 |
| H1'/f1 | 0.280 | 0.471 | 0.304 |
| f2 | −2.372 | −2.702 | −2.377 |
| \|f2\|/ $\sqrt{(fW \cdot fT)}$ | 0.400 | 0.463 | 0.399 |
| f3 | 6.092 | 6.990 | 6.128 |
| f3/fW | 6.092 | 6.990 | 6.128 |
| f4 | −6.965 | −8.220 | −7.195 |
| \|f4\|/fW | 6.965 | 8.220 | 7.195 |
| f5 | 5.600 | 6.434 | 5.717 |
| f5/fW | 5.600 | 6.434 | 5.717 |
| D4W | 7.651 | 8.715 | 7.672 |
| \|D4W/f4\| | 1.098 | 1.060 | 1.066 |

The specific shapes and structures and the numerical values of the respective parts illustrated in the above-mentioned preferred embodiments and the numerical value embodiments are only for purposes of illustration of implementation performed when putting the present invention into practice; one should not interpret restrictively the technical scope of the invention by these.

The present invention is applicable to video cameras, still picture video cameras, still cameras, etc. and enables one to construct them in a compact form while permitting excellent correction for various aberrations and achieving ultrahigh ratio covering an ultra-wide-angle to an ultra-telephoto.

It should be understood by those skilled in the art that various modifications, combinations, sub-combinations and alterations may occur depending on design requirements and other factors insofar as they are within the scope of the appended claims or the equivalents thereof.

What is claimed is:

1. A camera system comprising:
   a zoom lens;
   phototaking means converting an image captured by said zoom lens into an electric image signal; and
   image control means, wherein:
      said image control means is configured so as to form a new image signal subjected to coordinate conversion by shifting a point on an image defined by an image signal formed through said phototaking means, while referring to a conversion coordinate factor previously provided in response to a variable power rate through said zoom lens, and then output the new image signal,
      said zoom lens is made up of a first lens group having positive refracting power, a second lens group having negative refracting power, a third lens group having positive refracting power, a fourth lens group having negative refracting power, and a fifth lens group having positive refracting power, which are disposed in this order from an object side, and is configured so that the first lens group, the third lens group, and the fifth lens group are stationary; the second lens group is shifted in an optical axis direction to mainly perform variable power; and the fourth lens group is shifted in the optical axis direction to perform correction for image position fluctuations and focusing, and said first lens group is configured by disposing, in order from the object side, a concave lens group made up of one or more lenses; a convex lens with a strong convexity facing toward an image side; a cemented lens including a concave lens and a convex lens having an Abbe number vd not less than 84; and a convex lens with a strong convexity facing toward the object side, wherein a surface making contact with the air of said cemented lens and at least one surface of said convex lens closest to the image side are composed of an aspheric surface.

2. The camera system as claimed in claim 1, wherein:

the cemented lens of said first lens group is configured as a triple-cemented lens comprising a concave meniscus lens with a convexity facing toward the object side, a double convex lens having an Abbe number vd not less than 84, and a concave meniscus lens with a concavity facing toward the object side, arranged in this order from the object side.

3. The camera system as claimed in claim 1, wherein:

the concave lens group closest to the object side in said first lens group is composed of one concave lens, and satisfies each of the following conditional expressions (1), (2) and (3):

$$5 < |f1F|/f1, \tag{1}$$

$$0.4 < dp/f1 < 1.5, \text{ and} \tag{2}$$

$$0.2 < H1'/f1 < 0.35, \text{ where:} \tag{3}$$

f1 is a focal length of the first lens group;

f1F is a synthetic focal length of the concave lens group closest to the object side of the first lens group and the convex lens with a strong convexity to the image side;

dp is a thickness of the convex lens with a strong convexity toward the image side of the first lens group; and H1' is a distance from a vertex of a surface closest to the image side of the first lens group to a principal point on the image side of the first lens group ("−" indicates the object side, and "+" indicates the image side).

4. The camera system as claimed in claim 2, wherein:

the concave lens group closest to the object side in said first lens group is composed of one concave lens, and satisfies each of the following conditional expressions (1), (2) and (3):

$$5 < |f1F|/f1, \tag{1}$$

$$0.4 < dp/f1 < 1.5, \text{ and} \tag{2}$$

$$0.2 < H1'/f1 < 0.35, \text{ where:} \tag{3}$$

f1 is a focal length of the first lens group;

f1F is a synthetic focal length of the concave lens group closest to the object side of the first lens group and the convex lens with a strong convexity to the image side;

dp is a thickness of the convex lens with a strong convexity toward the image side of the first lens group; and H1' is a distance from a vertex of a surface closest to the image side of the first lens group to a principal point on the image side of the first lens group ("−" indicates the object side, and "+" indicates the image side).

5. The camera system as claimed in claim 1, wherein:

the concave lens group closest to the object side in said first lens group is composed of a concave meniscus lens with a convexity facing toward the object side and a double convex lens, and satisfies each of the following conditional expressions (1'), (2) and (4):

$$4 < |f1F|/f1, \tag{1'}$$

$$0.4 < dp/f1 < 1.5, \text{ and} \tag{2}$$

$$0.35 < H1'/f1 < 0.6, \text{ where:} \tag{4}$$

f1 is a focal length of the first lens group;

f1F is a synthetic focal length of the concave lens group closest to the object side of the first lens group and the convex lens with a strong convexity to the image side;

dp is a thickness of the convex lens with a strong convexity toward the image side of the first lens group; and H1' is a distance from a vertex of a surface closest to the image side of the first lens group to a principal point on the image side of the first lens group ("−" indicates the object side, and "+" indicates the image side).

6. The camera system as claimed in claim 2, wherein:

the concave lens group closest to the object side in said first lens group is composed of a concave meniscus lens with a convexity facing toward the object side and a double convex lens, and satisfies each of the following conditional expressions (1'), (2) and (4):

$$4 < |f1F|/f1, \tag{1'}$$

$$0.4 < dp/f1 < 1.5, \text{ and} \tag{2}$$

$$0.35 < H1'/f1 < 0.6, \text{ where:} \tag{4}$$

f1 is a focal length of the first lens group;

f1F is a synthetic focal length of the concave lens group closest to the object side of the first lens group and the convex lens with a strong convexity to the image side;

dp is a thickness of the convex lens with a strong convexity toward the image side of the first lens group; and H1' is a distance from a vertex of a surface closest to the image side of the first lens group to a principal point on the image side of the first lens group ("−" indicates the object side, and "+" indicates the image side).

7. The camera system as claimed in claim 1, wherein:

an aspheric surface of said first lens group is disposed on a surface on the object side of the convex lens closest to the image side of said first lens group, and is configured to have a shape in which curvature is relaxed than a paraxial spherical surface as a distance from an optical axis increases within an effective diameter.

8. The camera system as claimed in claim 1, wherein:

said zoom lens satisfies each of the following conditional expressions (5) to (9):

$$0.35 < |f2|/\sqrt{(fW \cdot f)} < 0.55, \tag{5}$$

$$3.5 < f3/fW < 9, \tag{6}$$

$$4.5 < |f4|/fW < 10, \tag{7}$$

$$4 < f5/fW < 8, \text{ and} \tag{8}$$

$$1.0 < |D4W/f4| < 1.3, \text{ where:} \tag{9}$$

fW is a focal length of the overall system at a wide angle end;

fT is a focal length of the overall system at a telephoto end;

fi is a focal length of the i-th lens group; and

D4W is spacing between the fourth lens group and the fifth lens group when focusing on an infinite object at the wide angle end.

9. A camera system comprising:

a zoom lens;

phototaking means converting an image captured by said zoom lens into an electric image signal; and image control means, wherein:

said image control means is configured so as to form a new image signal subjected to coordinate conversion by shifting a point on an image defined by an image signal formed through said phototaking means, while referring to a conversion coordinate factor previously provided in response to a variable power rate through said zoom lens, and then output the new image signal, said zoom lens is made up of a first lens group having positive refracting power, a second lens group having negative refracting power, a third lens group having positive refracting power, a fourth lens group having negative refracting power, and a fifth lens group having positive refracting power, which are disposed in this order from an object side, and is configured so that the first lens group, the third lens group, and the fifth lens group are stationary; the second lens group is shifted in an optical axis direction to mainly perform variable power; and the fourth lens group is shifted in the optical axis direction to perform correction for image position fluctuations and focusing, and said first lens group is configured by disposing, in order from the object side, a concave lens group made up of one or more lenses; a prism that refracts an optical path by reflection; a convex lens with a strong convexity facing toward an image side; a cemented lens including a concave lens and a convex lens having an Abbe number vd not less than 84; and a convex lens with a strong convexity facing toward the object side, wherein a surface making contact with the air of said cemented lens and at least one surface of said convex lens closest to the image side are composed of an aspheric surface.

10. The camera system as claimed in claim 9, wherein:

the cemented lens of said first lens group is configured as a triple-cemented lens comprising a concave meniscus lens with a convexity facing toward the object side, a double convex lens having an Abbe number vd not less than 84, and a concave meniscus lens with a concavity facing toward the object side, arranged in this order from the object side.

11. The camera system as claimed in claim 9, wherein:

the concave lens group closest to the object side in said first lens group is composed of one concave lens and satisfies each of the following conditional expressions (1), (2) and (3):

$$5 < |f1F|/f1, \quad (1)$$

$$0.4 < dp/f1 < 1.5, \text{ and} \quad (2)$$

$$0.2 < H1'/f1 < 0.35, \text{ where:} \quad (3)$$

f1 is a focal length of the first lens group;

f1F is a synthetic focal length of the concave lens group closest to the object side of the first lens group and the convex lens with a strong convexity to the image side;

dp is a sum of the thickness of the prism refracting an optical path by reflection, and that of the convex lens with a strong convexity toward the image side; and H1' is a distance from a vertex of a surface closest to the image side of the first lens group to a principal point on the image side of the first lens group ("−" indicates the object side, and "+" indicates the image side).

12. The camera system as claimed in claim 10, wherein:

the concave lens group closest to the object side in said first lens group is composed of one concave lens and satisfies each of the following conditional expressions (1), (2) and (3):

$$5 < |f1F|/f1, \quad (1)$$

$$0.4 < dp/f1 < 1.5, \text{ and} \quad (2)$$

$$0.2 < H1'/f1 < 0.35, \text{ where:} \quad (3)$$

f1 is a focal length of the first lens group;

f1F is a synthetic focal length of the concave lens group closest to the object side of the first lens group and the convex lens with a strong convexity to the image side;

dp is a sum of the thickness of the prism refracting an optical path by reflection, and that of the convex lens with a strong convexity toward the image side; and H1' is a distance from a vertex of a surface closest to the image side of the first lens group to a principal point on the image side of the first lens group ("−" indicates the object side, and "+" indicates the image side).

13. The camera system as claimed in claim 9, wherein:

the concave lens group closest to the object side in said first lens group is composed of a concave meniscus lens with a convexity facing toward the object side and a double convex lens, and satisfies each of the following conditional expressions (1'), (2) and (4):

$$4 < |f1F|/f1, \quad (1')$$

$$0.4 < dp/f1 < 1.5, \text{ and} \quad (2)$$

$$0.35 < H1'/f1 < 0.6, \text{ where:} \quad (4)$$

f1 is a focal length of the first lens group;

f1F is a synthetic focal length of the concave lens group closest to the object side of the first lens group and the convex lens with a strong convexity to the image side;

dp is a sum of the thickness of the prism refracting an optical path by reflection, and that of the convex lens with a strong convexity toward the image side; and H1' is a distance from a vertex of a surface closest to the image side of the first lens group to a principal point on the image side of the first lens group ("−" indicates the object side, and "+" indicates the image side).

14. The camera system as claimed in claim 10, wherein:

the concave lens group closest to the object side in said first lens group is composed of a concave meniscus lens with a convexity facing toward the object side and a double convex lens, and satisfies each of the following conditional expressions (1'), (2) and (4):

$$4 < |f1F|/f1, \quad (1')$$

$$0.4 < dp/f1 < 1.5, \text{ and} \quad (2)$$

$$0.35 < H1'/f1 < 0.6, \text{ where:} \quad (4)$$

f1 is a focal length of the first lens group;

f1F is a synthetic focal length of the concave lens group closest to the object side of the first lens group and the convex lens with a strong convexity to the image side;

dp is a sum of the thickness of the prism refracting an optical path by reflection, and that of the convex lens with a strong convexity toward the image side; and H1' is a distance from a vertex of a surface closest to the image side of the first lens group to a principal point on the image side of the first lens group ("−" indicates the object side, and "+" indicates the image side).

15. The camera system as claimed in claim 9, wherein:

an aspheric surface of said first lens group is disposed on a surface on the object side of the convex lens closest to the image side of the first lens group, and is configured to have a shape in which curvature is more relaxed than a paraxial spherical surface as a distance from an optical axis increases within an effective diameter.

16. The camera system as claimed in claim 9, wherein:

said zoom lens satisfies each of the following conditional expressions (5) to (9):

$$0.35 < |f2|/\sqrt{(fW \cdot fT)} < 0.55, \tag{5}$$

$$3.5 < f3/fW < 9, \tag{6}$$

$$4.5 < |f4|/fW < 10, \tag{7}$$

$$4 < f5/fW < 8, \text{ and} \tag{8}$$

$$1.0 < |D4W/f4| < 1.3, \text{ where:} \tag{9}$$

fW is a focal length of the overall system at a wide angle end;

fT is a focal length of the overall system at a telephoto end;

fi is a focal length of the i-th lens group;

D4W is spacing between the fourth lens group and the fifth lens group when focusing on an infinite object at the wide angle end.

17. A zoom lens, comprising: a first lens group having positive refracting power, a second lens group having negative refracting power, a third lens group having positive refracting power, a fourth lens group having negative refracting power, and a fifth lens group having positive refracting power, which are disposed in this order from an object side, and configured so that the first lens group, the third lens group, and the fifth lens group are stationary; the second lens group is shifted in an optical axis direction to mainly perform variable power; and the fourth lens group is shifted in the optical axis direction to perform correction for image position fluctuations and focusing, wherein:

said first lens group is configured by disposing, in order from the object side, a concave lens group made up of one or more lenses; a convex lens with a strong convexity facing toward an image side; a cemented lens including a concave lens and a convex lens having an Abbe number vd not less than 84; and a convex lens with a strong convexity facing toward the object side, wherein a surface making contact with the air of said cemented lens and at least one surface of said convex lens closest to the image side are composed of an aspheric surface.

18. The zoom lens as claimed in claim 17, wherein:

the cemented lens of said first lens group is configured as a triple-cemented lens comprising a concave meniscus lens with a convexity facing toward the object side, a double convex lens having an Abbe number vd not less than 84, and a concave meniscus lens with a concavity facing toward the object side, arranged in this order from the object side.

19. The zoom lens as claimed in claim 17, wherein:

the concave lens group closest to the object side in said first lens group is composed of one concave lens and satisfies each of the following conditional expressions (1); (2) and (3):

$$5 < |f1F|/f1, \tag{1}$$

$$0.4 < dp/f1 < 1.5, \text{ and} \tag{2}$$

$$0.2 < H1'/f1 < 0.35, \text{ where:} \tag{3}$$

f1 is a focal length of the first lens group;

f1F is a synthetic focal length of the concave lens group closest to the object side of the first lens group and the convex lens with a strong convexity to the image side;

dp is a thickness of the convex lens with a strong convexity toward the image side of the first lens group; and H1' is a distance from a vertex of a surface closest to the image side of the first lens group to a principal point on the image side of the first lens group ("−" indicates the object side, and "+" indicates the image side).

20. The zoom lens as claimed in claim 18, wherein:

the concave lens group closest to the object side in said first lens group is composed of one concave lens and satisfies each of the following conditional expressions (1), (2) and (3):

$$5 < |f1F|/f1, \tag{1}$$

$$0.4 < dp/f1 < 1.5, \text{ and} \tag{2}$$

$$0.2 < H1'/f1 < 0.35, \text{ where:} \tag{3}$$

f1 is a focal length of the first lens group;

f1F is a synthetic focal length of the concave lens group closest to the object side of the first lens group and the convex lens with a strong convexity to the image side;

dp is a thickness of the convex lens with a strong convexity toward the image side of the first lens group; and H1' is a distance from a vertex of a surface closest to the image side of the first lens group to a principal point on the image side of the first lens group ("−" indicates the object side, and "+" indicates the image side).

21. The zoom lens as claimed in claim 17, wherein:

the concave lens group closest to the object side in said first lens group is composed of a concave meniscus lens with a convexity facing toward the object side and a double convex lens, and satisfies each of the following conditional expressions (1'), (2) and (4):

$$4 < |f1F|/f1, \tag{1'}$$

$$0.4 < dp/f1 < 1.5, \text{ and} \tag{2}$$

$$0.35 < H1'/f1 < 0.6, \text{ where:} \tag{4}$$

f1 is a focal length of the first lens group;

f1F is a synthetic focal length of the concave lens group closest to the object side of the first lens group and the convex lens with a strong convexity to the image side;

dp is a thickness of the convex lens with a strong convexity toward the image side of the first lens group; and H1' is a distance from a vertex of a surface closest to the image side of the first lens group to a principal point on the image side of the first lens group ("−" indicates the object side, and "+" indicates the image side).

22. The zoom lens as claimed in claim 18, wherein:

the concave lens group closest to the object side in said first lens group is composed of a concave meniscus lens with a convexity facing toward the object side and a double convex lens, and satisfies each of the following conditional expressions (1'), (2) and (4):

$$4<|f1F|/f1, \quad (1')$$

$$0.4<dp/f1<1.5, \text{ and} \quad (2)$$

$$0.35<H1'/f1<0.6, \text{ where:} \quad (4)$$

f1 is a focal length of the first lens group;

f1F is a synthetic focal length of the concave lens group closest to the object side of the first lens group and the convex lens with a strong convexity to the image side;

dp is a thickness of the convex lens with a strong convexity toward the image side of the first lens group; and H1' is a distance from a vertex of a surface closest to the image side of the first lens group to a principal point on the image side of the first lens group ("−" indicates the object side, and "+" indicates the image side).

23. The zoom lens as claimed in claim 17, wherein:

an aspheric surface of said first lens group is disposed on a surface on the object side of the convex lens closest to the image side of the first lens group, and is configured to have a shape in which curvature is relaxed than a paraxial spherical surface as a distance from an optical axis increases within an effective diameter.

24. The zoom lens as claimed in claim 17, wherein:

each of the following conditional expressions (5) to (9) is satisfied:

$$0.35<|f2|/\sqrt{(fW \cdot fT)}<0.55, \quad (5)$$

$$3.5<f3/fW<9, \quad (6)$$

$$4.5<|f4|/fW<10, \quad (7)$$

$$4<f5/fW<8, \text{ and} \quad (8)$$

$$1.0<|D4W/f4|<1.3, \text{ where:} \quad (9)$$

fW is a focal length of the overall system at a wide angle end;

fT is a focal length of the overall system at a telephoto end;

fi is a focal length of the i-th lens group;

D4W is spacing between the fourth lens group and the fifth lens group when focusing on an infinite object at the wide angle end.

25. A zoom lens comprising: a first lens group having positive refracting power, a second lens group having negative refracting power, a third lens group having positive refracting power, a fourth lens group having negative refracting power, and a fifth lens group having positive refracting power, which are disposed in this order from an object side, and configured so that the first lens group, the third lens group, and the fifth lens group are stationary; the second lens group is shifted in an optical axis direction to mainly perform variable power; and the fourth lens group is shifted in the optical axis direction to perform correction for image position fluctuations and focusing, wherein:

said first lens group is configured by disposing, in order from the object side, a concave lens group made up of one or more lenses; a prism that refracts an optical path by reflection; a convex lens with a strong convexity facing toward an image side; a cemented lens including a concave lens and a convex lens having an Abbe number vd not less than 84; and a convex lens with a strong convexity facing toward the object side, wherein a surface making contact with the air of said cemented lens and at least one surface of said convex lens closest to the image side are composed of an aspheric surface.

26. The zoom lens as claimed in claim 25, wherein:

the cemented lens of said first lens group is configured as a triple-cemented lens comprising a concave meniscus lens with a convexity facing toward the object side, a double convex lens having an Abbe number vd not less than 84, and a concave meniscus lens with a concavity facing toward the object side, arranged in order from an object side.

27. The zoom lens as claimed in claim 25, wherein:

the concave lens group closest to the object side in said first lens group is composed of one concave lens and satisfies each of the following conditional expressions (1), (2) and (3):

$$5<|f1F|/f1, \quad (1)$$

$$0.4<dp/f1<1.5, \text{ and} \quad (2)$$

$$0.2<H1'/f1<0.35, \text{ where:} \quad (3)$$

f1 is a focal length of the first lens group;

f1F is a synthetic focal length of the concave lens group closest to the object side of the first lens group and the convex lens with a strong convexity to the image side;

dp is a sum of the thickness of the prism refracting an optical path by reflection, and that of the convex lens with a strong convexity toward the image side; and H1' is a distance from a vertex of a surface closest to the image side of the first lens group to a principal point on the image side of the first lens group ("−" indicates the object side, and "+" indicates the image side).

28. The zoom lens as claimed in claim 26, wherein:

the concave lens group closest to the object side in said first lens group is composed of one concave lens and satisfies each of the following conditional expressions (1), (2) and (3):

$$5<|f1F|/f1, \quad (1)$$

$$0.4<dp/f1<1.5, \text{ and} \quad (2)$$

$$0.2<H1'/f1<0.35, \text{ where:} \quad (3)$$

f1 is a focal length of the first lens group;

f1F is a synthetic focal length of the concave lens group closest to the object side of the first lens group and the convex lens with a strong convexity to the image side;

dp is a sum of the thickness of the prism refracting an optical path by reflection, and that of the convex lens with a strong convexity toward the image side; and H1' is a distance from a vertex of a surface closest to the image side of the first lens group to a principal point on the image side of the first lens group ("−" indicates the object side, and "+" indicates the image side).

29. The zoom lens as claimed in claim 25, wherein:

the concave lens group closest to the object side in said first lens group is composed of a concave meniscus lens with a convexity facing toward the object side and a double convex lens, and satisfies each of the following conditional expressions (1'), (2) and (4):

$$4<|f1F|/f1, \quad (1')$$

$$0.4<dp/f1<1.5, \text{ and} \quad (2)$$

$$0.35<H1'/f1<0.6, \text{ where:} \quad (4)$$

f1 is a focal length of the first lens group;

f1F is a synthetic focal length of the concave lens group closest to the object side of the first lens group and the convex lens with a strong convexity to the image side;

dp is a sum of the thickness of the prism refracting an optical path by reflection, and that of the convex lens with a strong convexity toward the image side; and H1' is a distance from a vertex of a surface closest to the image side of the first lens group to a principal point on the image side of the first lens group ("−" indicates the object side, and "+" indicates the image side).

30. The zoom lens as claimed in claim 26, wherein:

the concave lens group closest to the object side in said first lens group is composed of a concave meniscus lens with a convexity facing toward the object side and a double convex lens, and satisfies each of the following conditional expressions (1'), (2) and (4):

$$4 < |f1F|/f1, \tag{1'}$$

$$0.4 < dp/f1 < 1.5, \text{ and} \tag{2}$$

$$0.35 < H1'/f1 < 0.6, \text{ where:} \tag{4}$$

f1 is a focal length of the first lens group;

f1F is a synthetic focal length of the concave lens group closest to the object side of the first lens group and the convex lens with a strong convexity to the image side;

dp is a sum of the thickness of the prism refracting an optical path by reflection, and that of the convex lens with a strong convexity toward the image side; and H1' is a distance from a vertex of a surface closest to the image side of the first lens group to a principal point on the image side of the first lens group ("−" indicates the object side, and "+" indicates the image side).

31. The zoom lens as claimed in claim 25, wherein:

an aspheric surface of said first lens group is disposed on a surface on the object side of the convex lens closest to the image side of the first lens group, and is configured to have a shape in which curvature is relaxed than a paraxial spherical surface as a distance from an optical axis increases within an effective diameter.

32. The zoom lens as claimed in claim 25, wherein:

each of the following conditional expressions (5) to (9) is satisfied:

$$0.35 < |f2|/\sqrt{(fW \cdot fT)} < 0.55, \tag{5}$$

$$3.5 < f3/fW < 9, \tag{6}$$

$$4.5 < |f4|/fW < 10, \tag{7}$$

$$4 < f5/fW < 8, \text{ and} \tag{8}$$

$$1.0 < |D4W/f4| < 1.3, \text{ where:} \tag{9}$$

fW is a focal length of the overall system at a wide angle end;

fT is a focal length of the overall system at a telephoto end;

fi is a focal length of the i-th lens group;

D4W is spacing between the fourth lens group and the fifth lens group when focusing on an infinite object at the wide angle end.

* * * * *